United States Patent
Feit et al.

(10) Patent No.: US 11,307,756 B2
(45) Date of Patent: Apr. 19, 2022

(54) SYSTEM AND METHOD FOR PRESENTING MOVING GRAPHIC ANIMATIONS IN INACTIVE AND ACTIVE STATES

(71) Applicant: Honda Motor Co., Ltd., Tokyo (JP)

(72) Inventors: Steven Feit, Dublin, OH (US); Ross Cameron Miller, Hilliard, OH (US); Jessica Champi, Columbus, OH (US); Shaun Westbrook, Torrance, CA (US); Michael M. Tsay, Irvine, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/665,951

(22) Filed: Oct. 28, 2019

(65) Prior Publication Data
US 2020/0057544 A1 Feb. 20, 2020

Related U.S. Application Data

(63) Continuation of application No. 15/680,680, filed on Aug. 18, 2017, now abandoned, which is a (Continued)

(51) Int. Cl.
*G06F 3/0354* (2013.01)
*G06F 3/038* (2013.01)
(Continued)

(52) U.S. Cl.
CPC ............ *G06F 3/0488* (2013.01); *B60K 37/02* (2013.01); *G06F 3/038* (2013.01);
(Continued)

(58) Field of Classification Search
CPC ....... G06F 3/0488; G06F 3/14; G06F 3/03547
See application file for complete search history.

(56) References Cited

U.S. PATENT DOCUMENTS

| 4,782,327 A | 11/1988 | Kley et al. |
| 5,327,161 A | 7/1994 | Logan et al. |
| (Continued) | | |

FOREIGN PATENT DOCUMENTS

| CN | 1782975 | 6/2006 |
| CN | 101963857 | 2/2011 |
| (Continued) | | |

*Primary Examiner* — Ryan A Lubit
(74) *Attorney, Agent, or Firm* — Rankin, Hill & Clark LLP

(57) ABSTRACT

A method and system for providing absolute and zone coordinate mapping with graphic animations include presenting a user interface in an inactive state, wherein a background graphic animation and a user interface object graphic animation are presented on the user interface in an inactive format. The method and system also include determining that a touch input is provided on a touchpad to map a selected user interface object presented on the user interface based on an absolute mapped position of the touch input received on the touchpad. The method and system additionally include presenting the user interface in an active state, wherein the background graphic animation and the user interface object graphic animation are presented on the user interface in an active format.

20 Claims, 8 Drawing Sheets

Related U.S. Application Data continuation-in-part of application No. 15/633,809, filed on Jun. 27, 2017, now Pat. No. 10,037,091, which is a continuation of application No. 14/547,211, filed on Nov. 19, 2014, now Pat. No. 9,727,231.

(60) Provisional application No. 62/421,322, filed on Nov. 13, 2016.

(51) Int. Cl.

| | | |
|---|---|---|
| *G06F 3/041* | (2006.01) | |
| *G06F 3/0482* | (2013.01) | |
| *G06F 3/0488* | (2013.01) | |
| *G06F 3/14* | (2006.01) | |
| *B60K 37/02* | (2006.01) | |
| *G06F 3/04886* | (2022.01) | |
| *G09G 5/00* | (2006.01) | |

(52) U.S. Cl.
CPC ........ *G06F 3/03547* (2013.01); *G06F 3/0416* (2013.01); *G06F 3/0482* (2013.01); *G06F 3/04886* (2013.01); *G06F 3/14* (2013.01); *B60K 2370/11* (2019.05); *B60K 2370/1438* (2019.05); *G09G 5/00* (2013.01); *G09G 2340/14* (2013.01); *G09G 2380/10* (2013.01)

(56) References Cited

U.S. PATENT DOCUMENTS

| | | | |
|---|---|---|---|
| 5,617,117 | A | 4/1997 | Kataoka et al. |
| 6,029,214 | A | 2/2000 | Dorfman et al. |
| 6,043,818 | A | 3/2000 | Nakano et al. |
| 6,262,717 | B1 | 7/2001 | Donohue et al. |
| 6,559,833 | B2 | 5/2003 | Rowe |
| 6,750,803 | B2 | 6/2004 | Yates et al. |
| 6,765,557 | B1 | 7/2004 | Segal et al. |
| 7,889,175 | B2 | 2/2011 | Kryze et al. |
| 8,065,624 | B2 | 11/2011 | Morin et al. |
| 8,527,896 | B2 | 9/2013 | Matthews et al. |
| 8,527,900 | B2 | 9/2013 | Mueller et al. |
| 8,606,519 | B2 | 12/2013 | Waeller |
| 8,614,664 | B2 | 12/2013 | Yasutake |
| 8,711,115 | B2 | 4/2014 | Ozawa et al. |
| 8,854,433 | B1 | 10/2014 | Rafii |
| 8,937,590 | B2 | 1/2015 | Hachiya et al. |
| 9,009,612 | B2 | 4/2015 | Fleizach et al. |
| 9,039,513 | B2 | 5/2015 | Schultz et al. |
| 9,041,653 | B2 | 5/2015 | Chen et al. |
| 9,152,373 | B2 | 10/2015 | King |
| 9,201,587 | B2 | 12/2015 | Lin et al. |
| 9,213,482 | B2 | 12/2015 | Mai et al. |
| 9,223,493 | B2 | 12/2015 | Cho |
| 9,268,478 | B2 | 2/2016 | Nutaro et al. |
| 9,298,363 | B2 | 3/2016 | Crumly |
| 9,367,216 | B2 | 6/2016 | Zalewski et al. |
| 9,377,949 | B2 | 6/2016 | Zuo et al. |
| 2006/0071915 | A1 | 4/2006 | Rehnm |
| 2006/0119588 | A1 | 6/2006 | Yoon et al. |
| 2008/0074384 | A1 | 3/2008 | Orr et al. |
| 2008/0229258 | A1* | 9/2008 | Watson ................ G06F 16/954 |
| | | | 715/867 |
| 2008/0238880 | A1 | 10/2008 | Miwa |
| 2008/0272927 | A1* | 11/2008 | Woolley .................. G06F 3/041 |
| | | | 340/815.4 |
| 2009/0262086 | A1 | 10/2009 | Chen |
| 2010/0225599 | A1 | 9/2010 | Danielsson et al. |
| 2010/0308983 | A1 | 12/2010 | Conte et al. |
| 2010/0315266 | A1 | 12/2010 | Gunawardana et al. |
| 2011/0022990 | A1 | 1/2011 | Wu et al. |
| 2011/0134030 | A1 | 6/2011 | Cho |
| 2011/0141012 | A1 | 6/2011 | Noh et al. |
| 2011/0191723 | A1 | 8/2011 | Wu et al. |
| 2011/0205169 | A1 | 8/2011 | Yasutake |
| 2012/0007823 | A1 | 1/2012 | Ozawa et al. |
| 2012/0173890 | A1* | 7/2012 | Root ..................... G06F 1/3215 |
| | | | 713/300 |
| 2013/0033424 | A1 | 2/2013 | Sugawara |
| 2013/0050122 | A1 | 2/2013 | Kang et al. |
| 2013/0100158 | A1 | 4/2013 | Hongi et al. |
| 2013/0159902 | A1* | 6/2013 | Kwak ................... G06F 3/0482 |
| | | | 715/765 |
| 2013/0181952 | A1 | 7/2013 | Lin et al. |
| 2014/0007015 | A1 | 1/2014 | Ekstrand et al. |
| 2014/0015755 | A1 | 1/2014 | Hao et al. |
| 2014/0043535 | A1 | 2/2014 | Motoyama et al. |
| 2014/0111439 | A1 | 4/2014 | Joe et al. |
| 2014/0191996 | A1 | 7/2014 | Hwang et al. |
| 2014/0210795 | A1 | 7/2014 | Mattes et al. |
| 2014/0245229 | A1 | 8/2014 | Jeon et al. |
| 2014/0267121 | A1 | 9/2014 | Luo |
| 2015/0062004 | A1 | 3/2015 | Ragii |
| 2015/0128083 | A1* | 5/2015 | Jia ....................... G06F 3/04886 |
| | | | 715/773 |
| 2015/0227250 | A1 | 8/2015 | Chen et al. |
| 2015/0339025 | A1 | 11/2015 | Yamamoto |
| 2015/0378545 | A1 | 12/2015 | Telang et al. |
| 2016/0011712 | A1 | 1/2016 | Yamamoto et al. |
| 2016/0062543 | A1 | 3/2016 | Mai et al. |
| 2016/0070433 | A1 | 3/2016 | Fleizach et al. |
| 2016/0077713 | A1 | 3/2016 | Zuo et al. |
| 2016/0098099 | A1 | 4/2016 | Cho |
| 2016/0170577 | A1 | 6/2016 | Meganathan et al. |
| 2016/0259528 | A1* | 9/2016 | Foss ...................... G06F 3/0488 |
| 2017/0206055 | A1* | 7/2017 | Baker .................. G06F 3/04847 |
| 2018/0260096 | A1* | 9/2018 | Kamiya .............. G06F 3/04883 |

FOREIGN PATENT DOCUMENTS

| | | |
|---|---|---|
| CN | 101963858 | 2/2011 |
| CN | 101963859 | 2/2011 |
| CN | 102467261 | 5/2012 |
| CN | 102478996 | 5/2012 |
| CN | 105121227 | 12/2012 |
| CN | 102365611 | 12/2014 |
| CN | 102457295 | 12/2014 |
| CN | 101887323 | 3/2015 |
| CN | 104615262 | 5/2015 |
| CN | 104919403 | 9/2015 |
| CN | 102163096 | 11/2015 |
| CN | 103176691 | 11/2015 |
| CN | 101535933 | 12/2015 |
| CN | 103105963 | 3/2016 |
| CN | 102934049 | 6/2016 |
| CN | 103207757 | 7/2016 |
| WO | 2009076974 | 6/2009 |

\* cited by examiner

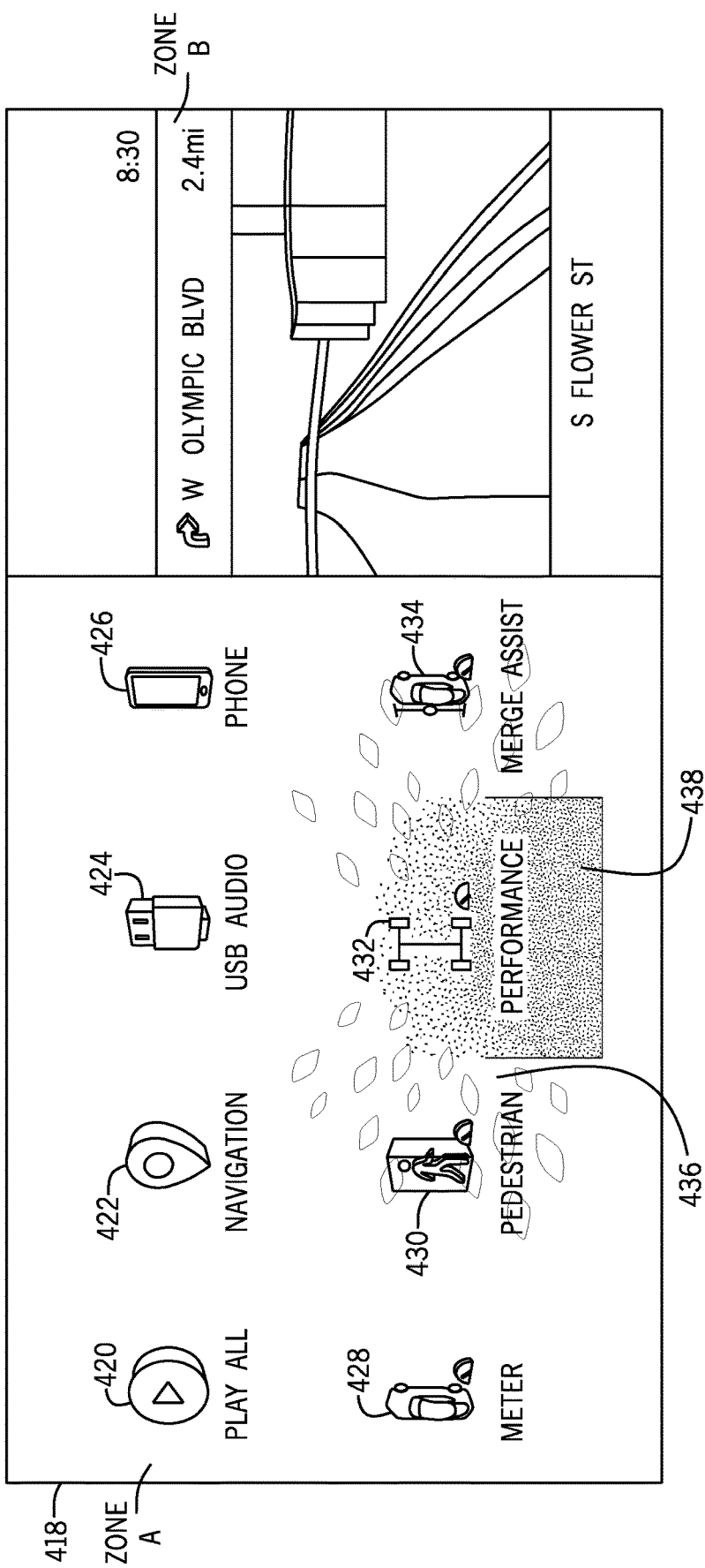

SYSTEM AND METHOD FOR PRESENTING MOVING GRAPHIC ANIMATIONS IN INACTIVE AND ACTIVE STATES

This application is a continuation of, and claims priority to, U.S. application Ser. No. 15/680,680, filed on Aug. 18, 2017, which is a continuation-in-part of, and claims priority to, U.S. application Ser. No. 15/633,809, filed on Jun. 27, 2017, which itself is a continuation of, and claims priority to, U.S. application Ser. No. 14/547,211, filed on Nov. 19, 2014 and issued as U.S. Pat. No. 9,727,231 on Aug. 8, 2017, the disclosures of which are incorporated herein by reference in their entireties. This application also claims the benefit of U.S. Provisional Application No. 62/421,322, filed on Nov. 13, 2016, the entire disclosure of which is incorporated herein by reference.

BACKGROUND

Vehicles are often equipped with one or more display units located at the vehicle dashboard or other area(s) of the vehicle that are utilized to provide various user interfaces to vehicle occupants. Many of the user interfaces have different formats and layouts that present users with various shapes, sizes, and locations of input icons through the one or more display units. In many instances, these user interfaces do not present intuitive graphics that represent input actions being conducted by users. Therefore, users that in many cases include a vehicle driver may not be aware that an input is registered that may be provided to a user interface of the vehicle. This limitation may cause the driver to provide multiple inputs to user interface objects and may cause inefficiency and frustration for the user, especially in the case of the vehicle driver.

In some cases, the one or more display units are operably connected to a touchpad that is remotely located within the vehicle (e.g., in the center panel of the vehicle) in order to provide inputs to user interface objects on the user interfaces. A key limitation of touchpads is that touchpads are relatively mapped to the display unit. For example, when the user touches the touchpad, the touchpad converts the input data into relative coordinate values causing a delayed access to input the user interface objects of the user interfaces being shown on a display screen. In other words, a touch input on a touchpad is not registered at the corresponding area of the display screen as it is being inputted on the touchpad by the user. In addition, conventionally a particular user interface object may only be selected when a user drags a cursor to the position of the user interface object on the display. Therefore, no input is received on any of the user interface objects unless the user touch inputs the touchpad by dragging, swiping, and/or moving touch inputs to manipulate the location of the cursor to one of the user interface objects.

BRIEF DESCRIPTION

According to one aspect, a method for providing absolute and zone coordinate mapping with graphic animations is provided. The method includes presenting a user interface in an inactive state, wherein a background graphic animation and a user interface object graphic animation are presented on the user interface in an inactive format. The method also includes determining that a touch input is provided on a touchpad to map a selected user interface object presented on the user interface based on an absolute mapped position of the touch input received on the touchpad. The method additionally includes presenting the user interface in an active state, wherein the background graphic animation and the user interface object graphic animation are presented on the user interface in an active format, wherein the background graphic animation is presented with a hovering effect emitting out from the user interface object graphic animation of the selected user interface object.

According to another aspect, a system for providing absolute and zone coordinate mapping with graphic animations is provided. The system includes a memory storing instructions when executed by a processor cause the processor to present a user interface in an inactive state, wherein a background graphic animation and a user interface object graphic animation are presented on the user interface in an inactive format, wherein the background graphic animation is presented as a stationary graphic when the user interface is presented in the inactive state. The instructions also cause the processor to determine that a touch input is provided on a touchpad to map a selected user interface object presented on the user interface based on an absolute mapped position of the touch input received on the touchpad. The instructions further cause the processor to present the user interface in an active state, wherein the background graphic animation and the user interface object graphic animation are presented on the user interface in an active format, wherein the background graphic animation is presented as a moving graphic when the user interface is presented in the active state.

According to still another aspect, a computer readable storage medium storing instructions that when executed by a computer, which includes at least a processor, causes the computer to perform a method that includes presenting a user interface in an inactive state, wherein a background graphic animation and a user interface object graphic animation are presented on the user interface in an inactive format, wherein the background graphic animation is presented as a stationary graphic when the user interface is presented in the inactive state. The instructions also include determining that a touch input is provided on a touchpad to map a selected user interface object presented on the user interface based on an absolute mapped position of the touch input received on the touchpad. The instructions further include presenting the user interface in an active state, wherein the background graphic animation and the user interface object graphic animation are presented on the user interface in an active format, wherein the background graphic animation is presented as a moving graphic when the user interface is presented in the active state.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 4C is an exemplary illustration of the vehicle HMI that is presented in an active state, according to an exemplary embodiment.

DETAILED DESCRIPTION

Figure 1:
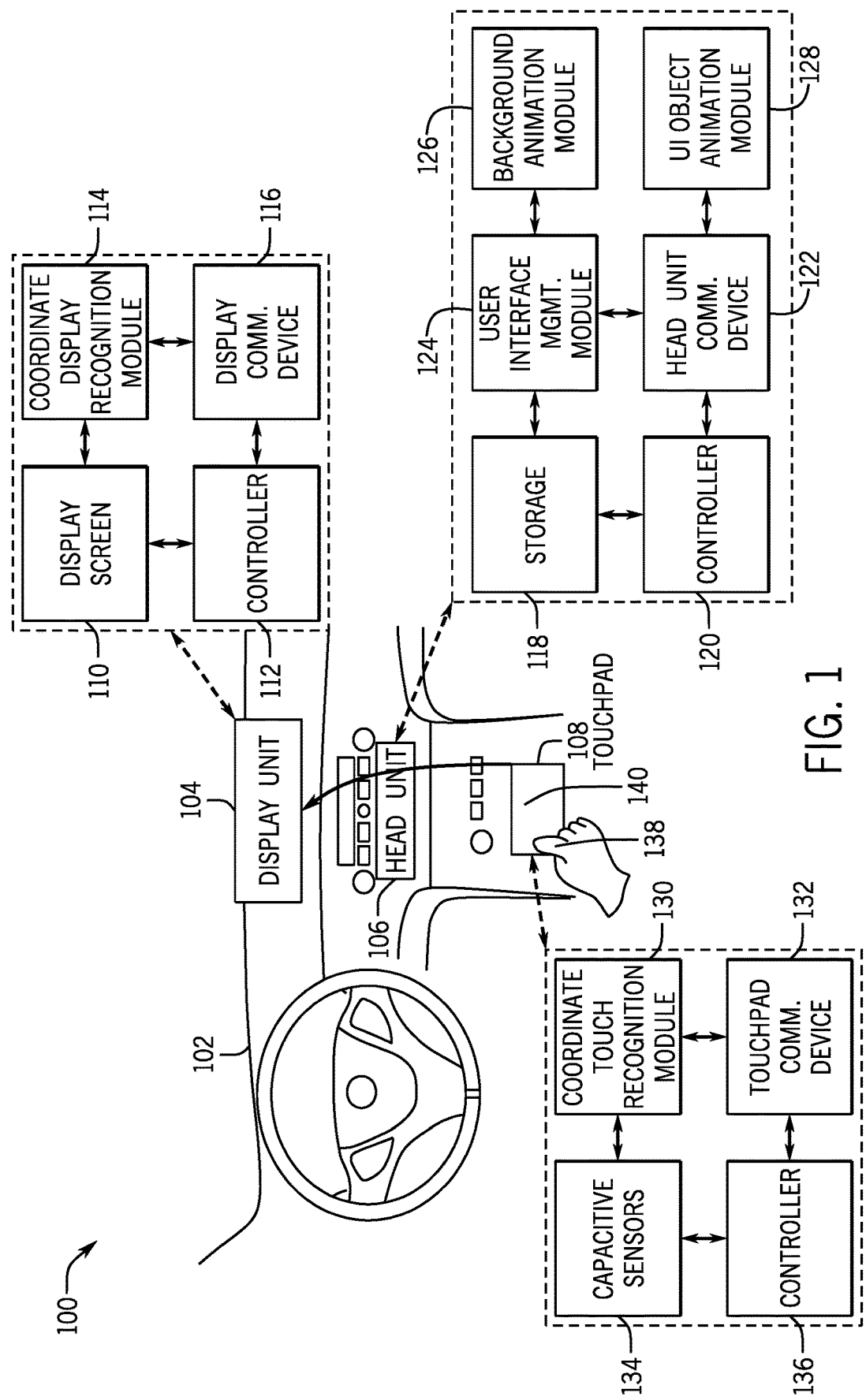
FIG. 1 is a schematic view of a system for providing absolute and zone coordinate mapping with user interface object graphic animation and background graphic animation according to an exemplary embodiment.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing signal that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein may include devices for controlling different vehicle features which are include various vehicle components, systems, and subsystems. The term "input device" includes, but is not limited to: push buttons, rotary knobs, and the like. The term "input device" additionally includes graphical input controls that take place within a user interface which may be displayed by various types of mechanisms such as software and hardware based controls, interfaces, or plug and play devices.

An "output device" as used herein may include devices that may derive from vehicle components, systems, subsystems, and electronic devices. The term "output devices" includes, but is not limited to: display units, and other devices for outputting information and functions.

Referring now to the drawings, wherein the showings are for purposes of illustrating one or more exemplary embodiments and not for purposes of limiting the same, FIG. 1 is a schematic view of a system for providing absolute and zone coordinate mapping with user interface object graphic animation and background graphic animation according to an exemplary embodiment. The system, which may also be referred to as an absolute zone mapping system, is generally designated by reference numeral 100. The components included within the system 100 may be interconnected via one or more system buses. It will be understood that FIG. 1 constitutes, in some respects, an abstraction and that the actual organization of the components of the system 100 may be more complex than illustrated. As described in more detailed below, the absolute zone mapping system 100 may be utilized to provide a user 138 (e.g., an occupant of the vehicle 102) with the ability to provide touch inputs through a touchpad 108 to various user interfaces shown through a display unit 104.

The absolute zone mapping system 100 utilizes absolute coordinate mapping that allows the user 138 to touch a specific portion of the surface 140 of the touchpad 108 and provide an input to a corresponding portion of the user interface shown on a display screen 110 of the display unit 104. In addition, the absolute zone mapping system 100 provides zone mapping in order for the user to utilize absolute coordinate mapping to input user interface objects in a rapid manner without having to touch input a portion of the touchpad 108 that is specifically mapped to the location of a user interface object.

In one embodiment, the system 100 is installed in the vehicle 102 that includes the display unit 104 that may be located within the center of the dashboard of the vehicle 102, as shown in FIG. 1, or any other location within the vehicle 102. The display unit 104 may include a display screen 110. In one embodiment, the display unit 104 may present one or more user interfaces that correspond to the one or more operating systems, applications, and/or vehicle systems and subsystems on the display screen 110. In some embodiments, the one or more user interfaces may present vehicle information including graphics that may be rendered and shown via the display screen, a meter display unit (not shown) of the vehicle 102 which may include a dashboard display or an instrument cluster display (both not shown), and/or a heads up display unit (not shown) of the vehicle 102.

As will be described in more detail below, the one or more user interfaces may include an exemplary vehicle human machine interface (vehicle HMI). As described below, the vehicle HMI may be presented in various states and with one or more user interface object graphic animations (UI object graphic animations) and a background graphic animation that may individually be based on touch inputs received on the touchpad 108.

In one or more embodiments, the display unit 104 may be configured in a variety of form factors, shapes, sizes, designs, and/or configurations. As will be discussed in more detail below, the display unit 104 is operably connected to the touchpad 108. The touchpad 108 is utilized by the user(s) to provide touch inputs to one or more user interfaces including the vehicle HMI that are executed and stored on a head unit 106 within the vehicle 102.

In addition to the display screen 110, the exemplary embodiment of the display unit 104 shown in FIG. 1 may include a controller 112, a coordinate display recognition module 114, and a display communication device 116. The display screen 110 may be a flat panel display that may include a liquid crystal display (LCD) device, an electroluminescent display (ELD) device, a field emission display (FED) device, a plasma display panel (PDP), a thin film transistor LCD (TFT-LCD) device, a flexible display unit, an organic light-emitting diode (OLED), an active-matrix organic light-emitting diode (AMOLED), etc. The display screen 110 may be configured in a variety of form factors, shapes, sizes, designs, and/or configurations. For example, the display screen 110 may be configured in a wide or ultra wide format. In an alternate embodiment, the display unit 104 may include a heads up display that projects the display screen 110 upon the windshield of the vehicle 102.

The controller 112 may control the display unit 104 based in part on coordinate data that is received by the display communication device 116. The controller 112 may be any hardware device capable of executing instructions stored within a memory/storage (not shown). As such, the controller 112 may include a microprocessor, field programmable gate array (FPGA), application-specific integrated circuit (ASIC), or other similar devices. The controller 112 may interact with a display driver (not shown) that is utilized to provide images to the display screen 110 based on commands sent by the controller 112. In one embodiment, inherent processing memory (not shown) of the controller 112 may store operational instructions, applications, and/or interfaces that are specific to the display unit 104 and are executed by the controller 112. For example, the controller 112 may execute a display settings user interface to be utilized by the user to select settings shown on the display screen 110 such as color, tint, sharpness, format, etc.

The display communication device 116 may be capable of providing wired or wireless computer communications utilizing various protocols to send/receive non-transitory signals internally to the head unit 106 and/or the touchpad 108 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the display communication device 116 may be operably connected for internal computer communications to the head unit 106 and/or touchpad 108 via a bus (e.g., a Controller Area Network (CAN) or a Local Interconnect Network (LIN) protocol bus). In an exemplary embodiment, the display communication device 116 may receive input signals and send output signals to both the head unit 106 and the touchpad 108. In one embodiment, the display communication device 116 may also communicate with external devices in order for the controller 112 to receive inputs to be shown on the display screen 110. For example, the display communication device 116 may communicate via wireless computer communication with the user's portable electronic device.

The display unit 104 also includes the coordinate display recognition module 114. In one embodiment, the coordinate display recognition module 114 is a separate hardware device that includes a separate processor, memory, storage, or other hardware. In an alternate embodiment, the coordinate display recognition module 114 may be included as part of the controller 112 (i.e., stored within the memory/storage of the controller) to be specifically utilized when executed. In an exemplary embodiment, the coordinate display recognition module 114 is utilized to determine the display coordinate values (display coordinates) of user interface objects that are presented (via the head unit 106) and displayed on the display screen 110. Display coordinates include locational coordinates that are determined based on the surface area of the display screen 110.

In an exemplary embodiment, the coordinate display recognition module 114 may be utilized to determine the display coordinates of one or more user interface objects, and/or an input indicator, as described in more detail below. The input indicator may be utilized by the display unit 104 as a visible or non-visible input point that may include the display coordinates that correspond to the touch input provided by the user 138 on the surface 140 of the touchpad 108. As described below, a position/location of the input indicator may be determined based on the absolute coordinate mapping or the zone coordinate mapping.

In one embodiment, the coordinate display recognition module 114 may identify the display coordinates as being x and y points that contain one or more pixels. The y point may define the vertical side(s) of the display screen 110, and the x point may define the horizontal side(s) of the display screen 110. In one embodiment, the coordinate display recognition module 114 may determine the display coordinates from an origin point being on the left top corner of the display screen 110. For example, based on an exemplary scaling system the "0,0" point is in the upper left corner of the display screen 110, and the "999,999" point is at the lower right corner of the display screen 110. In the example, the display coordinates represent a square shaped display screen, however, the display screen 110 may be configured in any form factor, shape, and/or size (e.g., widescreen, ultra widescreen). Therefore, the coordinate display recognition module 114 may utilize any type of scaling system that may depend on the size and shape of the display screen 110.

In one embodiment, the coordinate display recognition module 114 may utilize data sent from the head unit 106 (through the display communication device 116) with regards to one or more user input objects in order to evaluate specific display coordinates that may be utilized on the display screen 110 to display the user interface objects. In one embodiment, the coordinate display recognition module 114 may also send data to the head unit 106 (through the display communication device 116) with regards to the display coordinates of the input indicator with respect to the one or more user interface objects.

In an exemplary embodiment, the coordinate display recognition module 114 may utilize data sent from the touchpad 108 (through the display communication device 116) that includes touchpad coordinates with respect to touch inputs received by the user(s) in order to provide absolute coordinate mapping between the touchpad 108 and the display screen 110. In an exemplary embodiment, the coordinate display recognition module 114 may interpret one or more touchpad coordinates (x,y coordinate values that correspond to the position of the user's touch input upon the surface 140 of the touchpad 108) to determine placement of the input indicator that may indicate selection of one of the one or more user interface objects presented on the vehicle HMI.

In the embodiment shown in FIG. 1, the touchpad 108 may be in a form of a rectangular surface that includes the surface 140 that may translate the motion and position of one or more of the user's finger(s) to an absolute position on the display screen 110 of the display unit 104. The surface 140 of the touchpad 108 may be configured in a variety of form factors, shapes, sizes, designs, and/or configurations. For example, the surface 140 may be configured in a wide or ultra-wide format. In one embodiment, the touchpad 108 may provide tactile feedback and/or pressure sensing. For example, the touchpad 108 may receive an input by increasing the pressure of the user's finger on the surface 140 of the touchpad 108, instead of providing a separate touch input in the form of lifting and tapping the user's finger. In an alternate embodiment, the touchpad 108 may also include a "hot spot" location of the surface 140 of the touchpad 108 that provides specific types of functionality apart from the remaining portion of the surface 140. For example, a "hot spot" location of the surface 140 may include scrolling zones (horizontal and/or vertical scroll bars that are visibly shown on the surface 140 of the touchpad 108) that act as a scroll wheel specifically provided to quickly scroll through user interfaces shown on the display screen 110.

In one or more embodiments, the touchpad 108 may include hard buttons (not shown) that may include for example, a first hard button, a second hard button, and a third hard button. Upon input of one or more of the hard buttons by the user 138, the coordinate touch recognition module 130 may provide respective data to the head unit 106 to indicate the input of the respective hard button(s). The head unit 106 may analyze the data and may provide specific inputs to the one or more user interfaces including the vehicle HMI based on mapping of inputs to functions that correspond to the user interfaces(s). For example, the first button may include an activation input that may be inputted to activate the vehicle HMI from an inactive state, and the second button may include a deactivation button that may inputted to deactivate the vehicle HMI (e.g., put the vehicle HMI in an inactive state) from an active state. It is to be appreciated that the hard buttons may be inputted to provide a variety of functions that may respectively pertain to the one or more user interfaces being displayed on the display screen 110 of the display unit 104.

As described below, the absolute zone mapping system 100 utilizes absolute coordinate mapping that allows the user to touch a specific portion of the surface 140 of the touchpad 108 and simultaneously access a corresponding portion of the user interface being displayed on the display screen 110. Therefore, the touchpad coordinates on the surface 140 of the touchpad 108 may be absolute mapped to the display point coordinate values on the display screen 110 of the display unit 104. In other words, upon receiving a touch input on the touchpad 108 from the user(s), the absolute position where the user's finger touch inputs the surface 140 at specific touchpad coordinates is mapped by placing the input indicator at corresponding display coordinates on the display screen 110. Specifically, the absolute position at upper left corner of the touchpad surface coordinates may be mapped to the absolute location at upper left corner of the display screen coordinates. Similarly, the absolute position at lower left corner, lower right corner, and upper right corner of the touchpad surface coordinates are mapped to their respective corners on the display screen coordinates.

In an alternate embodiment, the touchpad 108 may include an input switch that provides the user the capability to switch between the absolute coordinate positioning mode and a relative coordinate positioning mode. For example, if the user would like to operate the touchpad 108 to provide the input indicator that is relatively positioned to the display unit 104 (in a manner similar to a computer mouse pointer), the touchpad 108 may be switched from the absolute coordinate mapping mode to the relative coordinate mapping mode. When the touchpad 108 is in the relative coordinate mapping mode, the touchpad coordinates of the touchpad 108 do not absolutely correspond to the display coordinates of the display screen 110. Therefore, in the relative coordinate mapping mode, the input indicator is independently positioned on the display screen 110 relative to the user's touch input received at specific touchpad coordinates on the surface 140 of the touchpad 108.

As shown in FIG. 1, in an exemplary embodiment, the touchpad 108 may include the coordinate touch recognition module 130, a touchpad communication device 132, capacitive sensors 134, and a controller 136. The capacitive sensors 134 may be capable of determining capacitance to sense the user touch input from the user's finger(s) on the surface 140 of the touchpad 108. In one embodiment, the capacitive sensors 134 may be located at numerous touchpad coordinate locations of the touchpad 108 and are able to sense touch inputs from every touch input provided at every touchpad coordinate location.

In an exemplary embodiment, the capacitive sensors 134 send a signal corresponding to multiple points of touch input received on the surface 140 of the touchpad 108. The capacitive sensors 134 may be able to sense multi-touch gestures as well as various types of gesturing techniques such as tapping gestures, swiping gestures, swirling gestures, scrolling gestures, etc. Additionally, the capacitive sensors may be able to sense the touch input position, the touch input speed, the touch input direction, the touch input angle, and the like and may provide respective data to the coordinate touch recognition module 130. The coordinate touch recognition module 130 may aggregate the data received from the capacitive sensors 134 into touchpoint data that represents a manner in which the touch input(s) are provided by the user 138 on the surface 140 of the touchpad 108. Additionally, as described below, the coordinate touch recognition module 130 may communicate the touchpoint data along with touchpad coordinates that correspond to the one or more touch inputs provided by the user 138 to the head unit 106.

In an alternate embodiment, the touchpad 108 may be a resistive touchpad that may not include the capacitive sensors 134. The resistive touchpad may instead include layered sheets that respond to pressure on the surface 140 of the touchpad 108 by contacting one another at specific touchpad coordinate locations based on the touch input of the user's finger(s), a stylus, or other device on the surface 140 of the touchpad 108. In yet an another embodiment, the touchpad 108 may be a conductance touchpad that includes two surfaces with sensors that connect to each other upon receiving the user's touch input at specific touchpad coordinate locations. It is to be appreciated that the resistive touchpad or the conductance touchpad may be configured with sensors that may be able to sense the touch input position, the touch input speed, the touch input direction, the touch input angle, and the like and may provide respective data to the coordinate touch recognition module 130. The coordinate touch recognition module 130 may aggregate the data received from the capacitive sensors 134 into the touchpoint data and may communicate the touchpoint data to the head unit 106.

In an exemplary embodiment, the controller 136 may control the touchpad 108 based in part on touch inputs received at touchpad coordinate location(s) that are sensed by the capacitive sensors 134. The controller 136 may be any hardware device capable of executing instructions stored within a memory/storage (not shown). As such, the controller 136 may include a microprocessor, field programmable gate array (FPGA), application-specific integrated circuit (ASIC), or other similar devices. The controller 136 may interact with a touchpad driver (not shown) that may interpret the user's touch inputs on the surface 140 of the touchpad 108.

In one embodiment, the controller 136 may evaluate touch inputs received on the surface 140 of the touchpad 108. Specifically, upon sensing of the touch input(s) from the user's finger touching the surface 140 of the touchpad 108, the capacitive sensors 134 may send one or more touch input signals to the controller 136 indicating the presence of the touch input(s) on the touchpad 108. In an exemplary embodiment, the controller 136 of the touchpad 108 may utilize instructions stored within inherent processing memory (not shown) of the controller 136 to provide commands to control and operate components of the touchpad 108 such as the coordinate touch recognition module 130.

In one embodiment, the coordinate touch recognition module 130 may include a separate hardware device that includes a separate processor, memory, storage, or other hardware. In an alternate embodiment, the coordinate touch recognition module 130 may be included as part of the controller 136 (i.e., stored within the inherent processing memory of the controller 136) to be specifically utilized when executed. In an exemplary embodiment, the coordinate touch recognition module 130 may be utilized to determine the touchpad coordinates of touch input(s) that are registered by the controller 136 and the touchpoint data that pertains to the touch input position, the touch input speed, the touch input direction, the touch input angle, and the like of the touch inputs(s) as discussed above. Specifically, upon the capacitive sensors 134 sensing the user's finger(s) touching the surface 140 of the touchpad 108, the controller 136 may register the touch input and may provide the touch input as raw data to the coordinate touch recognition module 130. The controller 136 may utilize the coordinate touch recognition module 130 to determine the touchpad coordinates of the touch input(s) on the surface 140 of the touchpad 108 and the touchpoint data that corresponds to the touch input(s).

In one embodiment, the coordinate touch recognition module 130 may identify the touchpad coordinates as being x and y points (corresponding to a horizontal and vertical axis) that contain one or more capacitive sensors 134. The y point may define the vertical side(s) of the touchpad 108, and the x point may define the horizontal side(s) of the touchpad 108. In one embodiment, the coordinate touch recognition module 130 may determine the touchpad coordinates from an origin point being on the left top corner of the surface 140 of the touchpad 108. For example, based on an exemplary scaling system, the "0,0" point is in the upper left corner of the touchpad 108, and the "399,399" point is at the lower right corner of the touchpad 108. In this example, the touchpad coordinates represent a square shaped touchpad, however, the touchpad 108 may be configured in any form factor, shape, and/or size (e.g., wide, ultra-wide). Therefore, the coordinate touch recognition module 130 may utilize any type of scaling system that may depend on the size and shape of the touchpad 108.

The touchpad communication device 132 may be capable of providing wired or wireless computer communications utilizing various protocols to send/receive non-transitory signals internally to the head unit 106 and/or the display unit 104 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system.

The touchpad communication device 132 may be operably connected for internal computer communications to the head unit 106 and/or display unit 104 via a bus. In one embodiment, the touchpad communication device 132 may receive input signals and send output signals to both the head unit 106 and the display unit 104. In one embodiment, the touchpad communication device 132 may also communicate with external devices in order for the controller 136 to send inputs to various vehicle systems and subsystems. For example, the touchpad communication device 132 may communicate directly with the vehicle audio system to provide input commands that are utilized for providing specific types of audio system functionality.

In an exemplary embodiment, the coordinate touch recognition module 130 may provide the touchpad coordinates to be utilized by the coordinate display recognition module 114 to position the input indicator at an absolute mapped position at corresponding display coordinates of the display screen 110. In an exemplary embodiment, the touchpad communication device 132 may communicate directly with the display communication device 116 in order for the coordinate touch recognition module 130 to provide the touchpad coordinate values to the coordinate display recognition module 114. In an alternate embodiment, the touchpad communication device 132 and the display communication device 116 may communicate directly in order for the coordinate display recognition module 114 to send display coordinates corresponding to one or more user interface objects that are presented on the display screen 110 to the coordinate touch recognition module 130.

In the embodiment shown in FIG. 1, the head unit 106 may include a storage 118, a controller 120, a head unit communication device 122, a user interface management module 124, a background animation module 126, and a user interface object animation module 128 (UI object animation module). In one embodiment, the coordinate touch recognition module 130 of the touchpad 108 may provide the touchpad coordinates corresponding to the touch input(s) received by the user 138 on the surface 140 of the touchpad 108 and related touchpoint data to the user interface management module 124 of the head unit 106. The user interface management module 124 may evaluate the touchpad coordinates and the touchpoint data to provide one or more respective graphic animations to the one or more user interfaces being executed by the head unit 106. As discussed below, upon receipt of the touchpad coordinates the user interface management module 124 may provide one or more respective data signals to the background animation module 126 and/or the UI object animation module 128 to provide one or more formats of the background graphic animation and/or one or more formats of one of or more UI object graphic animations presented on the vehicle HMI.

In one embodiment, the storage 118 of the head unit 106 may include various memories such as, for example L1, L2, or L3 cache or system memory. As such, the memory may include static random access memory (SRAM), dynamic RAM (DRAM), flash memory, read only memory (ROM), or other similar memory devices. The storage 118 may be utilized to store one or more operating systems, applications, associated operating system data, application data, vehicle system and subsystem user interface data, and the like that are executed by the controller 120. In one or more embodiments, the storage 118 may store data that may include user interface data that pertains to the vehicle HMI.

The controller 120 may be any hardware device capable of executing instructions stored within a memory/storage (not shown). As such, the controller 120 may include a microprocessor, field programmable gate array (FPGA), application-specific integrated circuit (ASIC), or other similar devices. In an exemplary embodiment, the controller 120 may be utilized to execute one or more user interfaces including the vehicle HMI that may be associated with the operating systems, applications, vehicle systems and subsystems. In one embodiment, the controller 120 may include an electronic control unit (not shown) of the vehicle 102 that may be utilized to control any and all electronic components located within the vehicle 102. In yet an alternate embodiment, the controller 120 may control the display unit 104 and/or the touchpad 108 in lieu of separate respective controllers 112, 136 included therein.

The head unit communication device 122 may be capable of providing wired or wireless computer communications utilizing various protocols to send/receive non-transitory signals internally to the display unit 104 and/or the touchpad 108 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the head unit communication device 122 may be operably connected for internal computer communications to the display unit 104 and/or touchpad 108 via a bus. In one embodiment, the head unit communication device 122 may also communicate with external devices in order for the controller 120 to execute computer program instructions located on an external device. For example, the head unit communication device 122 may communicate via wireless computer communication with the user's portable electronic device in order to execute an infotainment application that is stored on the portable electronic device through the vehicle infotainment system (not shown) to be displayed through the display unit 104.

In an exemplary embodiment, upon execution of one or more applications that are stored on the storage 118, the controller 120 may utilize the head unit communication device 122 to communicate via computer communication with the display communication device 116 in order to display one or more user interfaces and associated user interface objects on the display screen 110 of the display unit 104 that may include, but is not limited to the vehicle HMI. In one embodiment, the head unit communication device 122 may also be utilized to communicate with the touchpad 108 in order to provide data that pertains to user interfaces that correspond to the one or more operating systems, applications, and/or vehicle systems and subsystems.

In an exemplary embodiment, the user interface management module 124 is utilized to provide user interface data that pertains to the vehicle HMI. The user interface data provided by the user interface management module 124 may include data that pertains to graphics that may include, but are not limited to the UI object graphic animations, background graphics animations, and other graphics presented on the one or more user interfaces and user interface objects.

In one embodiment, the user interface management module 124 may communicate with the coordinate display recognition module 114 (via the communication devices 116 and 122) to determine the display coordinates of the display screen 110. In addition, the user interface management module 124 may send data to the coordinate display recognition module 114 respective of user interface objects that are to be placed at respective display coordinates of the display screen 110. In some embodiments, the coordinate display recognition module 114 may send data to the user interface management module 124 to indicate the display coordinates of the input indicator. The head unit 106 may evaluate this data and the vehicle HMI may be presented with the one or more UI object graphic animations associated to one of the user interface objects that are inputted based on the location of input indicator that correspond to the position of the touch input(s) provided by the user 138 on the surface 140 of the touchpad 108.

In one embodiment, the user interface management module 124 may also be utilized to provide data to the touchpad 108 in order to determine touchpad coordinates of the touchpad 108 that correspond to the graphics and user interface objects of the one or more user interfaces including the vehicle HMI being presented on the display screen 110. In an alternate embodiment, the user interface data provided by the user interface management module 124 may be utilized by the touchpad 108 to provide added functionality independent of any user interface object(s) displayed on the display screen 110. For example, the touchpad 108 may utilize a specific type of swiping, tapping, and/or sliding action of the user's finger on the touchpad 108 to activate functions of the vehicle audio system.

In one or more embodiments, the user interface management module 124 may interpret data provided by the touchpad 108 through the coordinate touch recognition module 130 that may indicate one or more touch inputs and the manner of the touch input(s) provided by the user 138. More specifically, the user interface management module 124 may interpret touchpad coordinates of touch input(s) received by the user 138 on the touchpad 108 and associated touchpoint data that may indicate the manner of the touch input(s) being inputted by the user on the surface 140 of the touchpad 108. In one embodiment, the user interface management module 124 may interpret one or more touch pad coordinates received from the touchpad 108 and the associated touchpoint data pertaining to the manner of the touch input and may provide one or more respective signals to the background animation module 126 and the UI object animation module 128 to indicate the receipt of the touch input and the touchpoint data.

In another embodiment, the coordinate display recognition module 114 may send data to the user interface management module 124 with regards to the one or more display coordinates of the input indicator with respect to the user interface objects being displayed on the display screen 110. The user interface management module 124 may interpret the data pertaining to the one or more display coordinates of the input indicator and may provide one or more respective signals to the background animation module 126 and the UI object animation module 128 to indicate the position of the input indicator. In some embodiments, the user interface management module 124 may receive both touchpad coordinates and touchpoint data and data with regards to the one or more display coordinates and may merge the data and provide the merged data to the background animation module 126 and the UI object animation module 128 in the form of one or more signals.

In one or more embodiments, upon receipt of the signal(s) from the user interface management module 124, the background animation module 126 may interpret one or more signals sent from the user interface management module 124 based on inputs received on the touchpad 108 by the user 138 to present one or more formats of background graphic animation on the one or more user interfaces including the vehicle HMI. In particular, the background animation module 126 may present the background graphic animation on the one or more user interfaces including the vehicle HMI in one or more different graphical formats based on the touchpad coordinates and related touchpoint data and/or the display coordinates of the input indicator. As described below in more detail, the background animation module 126 may provide the background graphic animation of the one or more user interfaces including the vehicle HMI in an inactive graphical format and in an active graphical format. In particular, within the inactive graphical format and the active graphical format the background graphic animation of the user interface(s) may be presented in a variety of manners that may pertain to the touch input(s) provided on the touchpad 108 and the manner of touch input(s).

In an exemplary embodiment, the UI object animation module 128 may interpret the one or more signals received from the user interface management module 124 based on inputs received on the touchpad 108 by the user 138 to present one or more formats of UI object graphic animations that are presented on the one or more user interfaces including the vehicle HMI. In particular, with respect to the vehicle HMI, the UI object animation module 128 may interpret one or more signals received from the user interface management module 124 to provide various formats of the UI object graphic animations that may be presented on the one or more user interfaces that include the vehicle HMI.

In one or more embodiments, upon receipt of the signal(s) from the user interface management module 124, the UI object animation module 128 may provide one or more UI object graphic animations being presented on the one or more user interfaces including the vehicle HMI in one or more different graphical formats based on the touchpad coordinates and related touchpoint data and/or the display coordinates of the input indicator. As described below in more detail, the UI object animation module 128 may provide the one or more UI object graphic animations pertaining to one or more respective user interface objects in an inactive graphical format and in an active graphical format. In particular, within the inactive graphical format and the active graphical format the one or more UI object graphic animations may be presented in a variety of manners that may pertain to the touch input(s) provided on the touchpad 108 and the manner of touch input(s).

Figure 2:
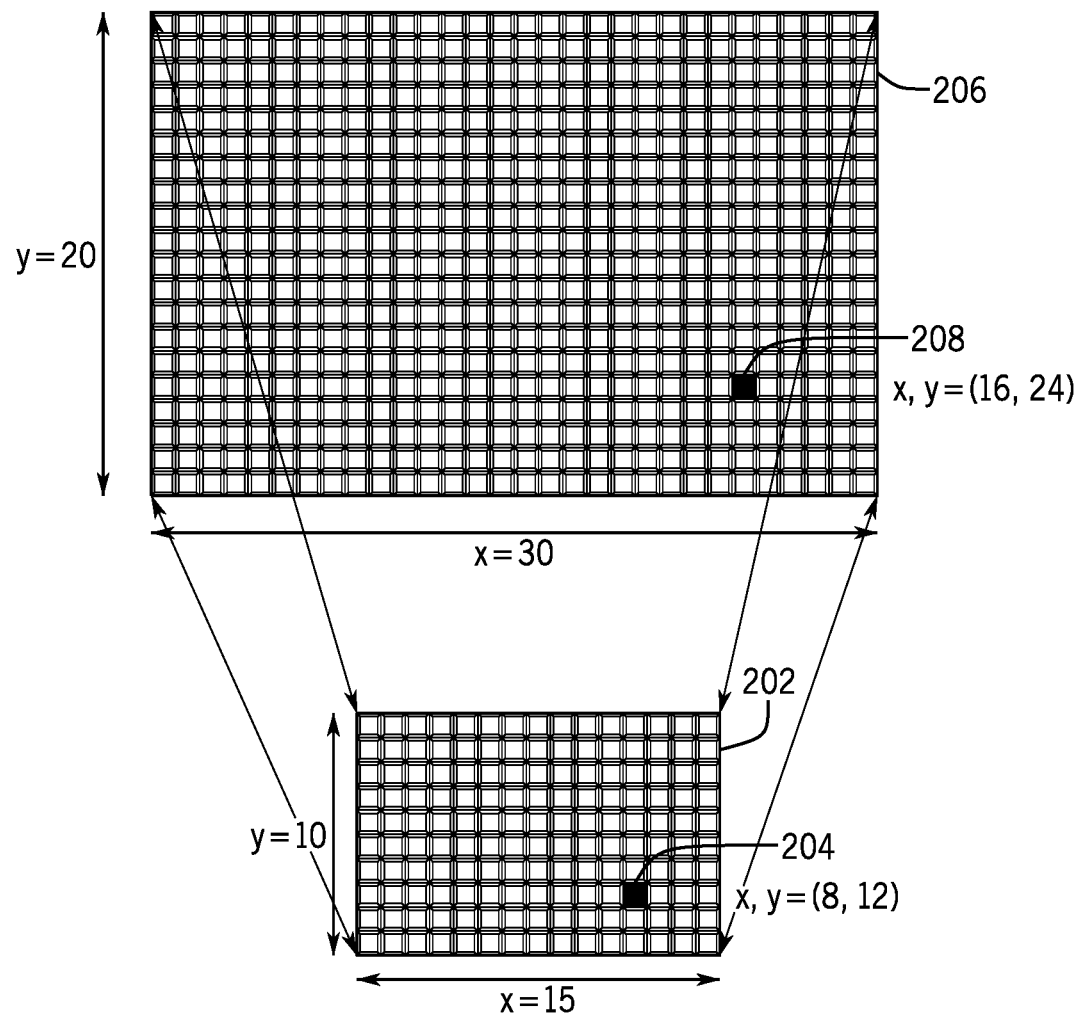
FIG. 2 is a view illustrating absolute coordinate mapping between a touchpad and a display screen, according to an exemplary embodiment.

FIG. 2 is a view illustrating absolute coordinate mapping between the touchpad 202 and the display screen 206, according to an exemplary embodiment. FIG. 2 illustrates the display screen 206 and the touchpad 202 utilizing a simplified coordinate scale for the purposes of providing a simplistic example of absolute coordinate mapping. As shown, the absolute position at the upper left and right corners of the surface 140 include touchpad coordinates that are mapped to the absolute location at upper left and right corners of display screen 206 that include corresponding display coordinates. Similarly, the absolute position at lower left corner and right corners of the surface 140 include touchpad coordinates that are mapped to the absolute location at their respective lower left and right corners of the display screen 206 that include corresponding display coordinates. Thus, each area of the surface 140 of the touchpad 202 has a corresponding absolute point on the display screen 206.

As stated above, the coordinate display recognition module 114 may utilize any type of scaling system that may depend on the size and dimensions of the display screen 206. Additionally, the coordinate touch recognition module 130 may also utilize any type of scaling system that may depend on the size and dimensions of the touchpad 202. The display screen 206 may be scaled by measuring the display screen dimensions and/or the number of horizontal (x) axis and vertical (y) axis display coordinates on the display screen 206 as determined by the coordinate display recognition module 114. In addition, the touchpad 202 may also be similarly scaled by measuring the touchpad dimensions and/or the number of horizontal (x) axis and vertical (y) axis touchpad coordinates on the touchpad 202 as determined by the coordinate touch recognition module 130.

In one embodiment, upon receiving the touch input from the user on the surface 140 of the touchpad 202, the coordinate touch recognition module 130 may determine the x and y touchpad coordinates of the user's touch input 204. In the illustrative example shown in FIG. 2, the capacitive sensors 134 may sense the user's touch input 204 and may provide touch sensing signal(s) to the coordinate touch recognition module 130. In one embodiment, the coordinate touch recognition module 130 may determine the x and y touchpad coordinates based on the location where the touch input is sensed on the surface 140 of the touchpad 202. As shown in the illustrative example, the coordinate touch recognition module 130 may determine the touchpad input occurring at the x,y touchpad coordinates (8,12) of the surface 140 of the touchpad 202.

In an exemplary embodiment, upon determining the touchpad coordinates, the coordinate touch recognition module 130 may utilize the touchpad communication device 132 to send the touchpad coordinate values to the display communication device 116 to be evaluated by the coordinate display recognition module 114. The coordinate display recognition module 114 may evaluate the touchpad coordinates received from the coordinate touch recognition module 130 in order to present the input indicator 208 at an absolute mapped position at display coordinates corresponding to the touchpad coordinates of the user's touch input 204.

In one embodiment, upon receiving the touchpad coordinate values via the display communication device 116, the coordinate display recognition module 114 may utilize an (x:y) coordinate display ratio between the touchpad 202 and the display screen 206 to determine corresponding (x,y) display coordinate values. Specifically, upon receiving the touchpad coordinates from the coordinate touch recognition module 130, the coordinate display recognition module 114 may evaluate the touchpad coordinates and may calculate proportionate display coordinate values based on the ratio between the display screen (x:y) scale and the touchpad (x:y) scale. In one embodiment, the (x:y) display ratio may include the ratio between the length of the horizontal axis of the touchpad 202 and the length of the horizontal axis of the display screen 206, and a ratio between the length of the vertical axis of the touchpad 202 and the length of the vertical axis of the display screen 206.

As shown in the illustrative example of FIG. 2, there may be a 1:2 display ratio between the touchpad 202 and the display screen 206 that includes 1:2 ratio on the x axis and a 1:2 ratio on the y axis. The coordinate display recognition module 114 may determine that the absolute display coordinate position on the display screen 206 at display coordinate values (16,24) based on the touch input 204 received on the touchpad 202 at touchpad coordinate values (8,12). Therefore, the coordinate display recognition module 114 may place the input indicator 208 at the location of the display screen 110 corresponding to the display coordinate values (16,24) in order to absolute map the touch input received on the touchpad 202 to the input indicator 208 presented on the display screen 206.

In one embodiment, the coordinate touch recognition module 130 may utilize the touchpad communication device 132 to send the touchpad coordinate values and the touchpoint data to the head unit communication device 122 to be evaluated by the user interface management module 124. Upon receiving the touchpad coordinate values and the touchpoint data, the user interface management module 124 may register the touchpad coordinate values and may send the one or more signals to the background animation module 126 and/or the UI object animation module 128, as discussed above to provide one or more respective graphic animations on the one or more user interfaces that may include the vehicle HMI. The user interface management module 124 may additionally communicate data respective of user interface objects, background graphic animations, and UI object graphic animations (that are to be placed at respective display coordinates of the display screen 110) along with the display coordinates values corresponding to the touchpad coordinate values to the coordinate display recognition module 114. In other words, the user interface management module 124 may evaluate the touchpad coordinate values, data provided by the background animation module 126 pertaining to background graphic animations, and/or data provided by the UI object animation module 128 pertaining to one or more UI object graphic animations and translate the data into display coordinate values that are sent to the coordinate display recognition module 114 to be utilized to provide the input indicator 208 and one or more user interface objects.

As described above, FIG. 2 shows the coordinate display recognition module 114 providing the input indicator 208 at the absolute mapped display coordinate values (16,24) of the display screen 206 that corresponds to the absolute location of the touch input 204 received at touchpad coordinate values (8,12) on the touchpad 202. Although in the example of FIG. 2, the touchpad coordinate values and the display point coordinate values are mapped as whole numbers, the coordinates may be specified to more defined/precise coordinate values that may provide coordinate values in two or more digit decimal place values. For example, the touch input may have been inputted between x coordinate values 8 and 9, and y coordinate values 7 and 8 providing an touchpad coordinate values of (8.57, 7.56).

Figure 3A:
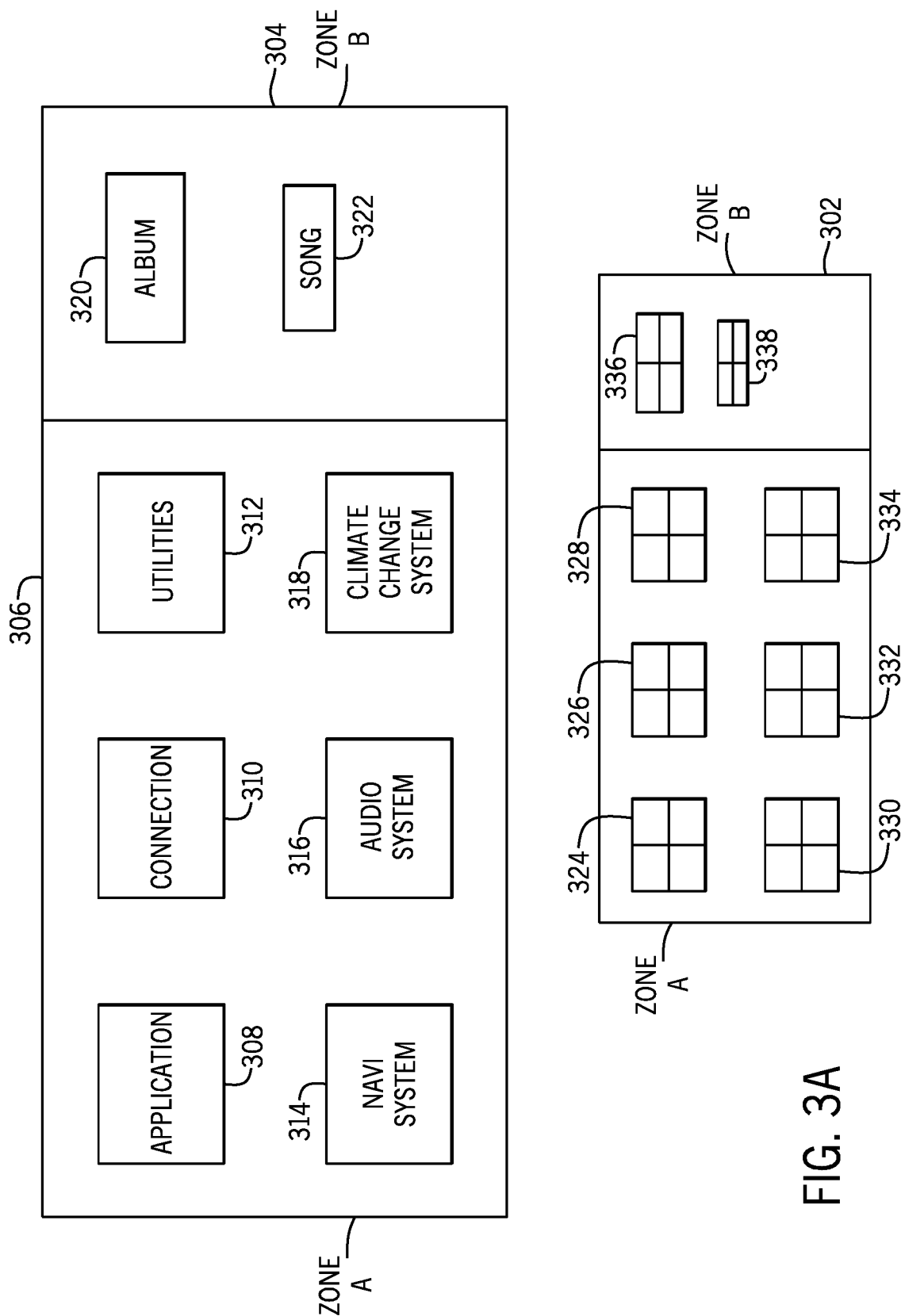
FIG. 3A is a view illustrating absolute coordinate mapping between the touchpad and the display screen presenting a vehicle human machine interface (vehicle HMI), according to an exemplary embodiment.

FIG. 3A is a view illustrating absolute coordinate mapping between the touchpad 108 and the display screen 110 presenting the vehicle HMI 306, according to an exemplary embodiment. FIG. 3A illustrates the display screen 304 and the touchpad 302 utilizing a simplified coordinate scale for the purposes of providing a simplistic example of absolute coordinate mapping between the touchpad 302 and the display screen 304. In the illustrative example shown, touchpad 302 is operating in the absolute coordinate mapping mode, as described above. As shown, the display screen 304 displays the vehicle HMI 306 that is presented from the head unit 106 of the vehicle 102. Specifically, in the illustrative example shown, the vehicle HMI 306 is presented as a vehicle system/function interface menu that may be utilized by the user 138 to navigate to one or more vehicle systems and/or functions.

The vehicle HMI 306 presented on the display screen 304 may present information, application, and other types of data. For example, the vehicle HMI may display audio information, navigation information, vehicle settings information, service information, communication applications (e.g., messaging, phone), notifications (e.g., via a notification bar and/or area (not shown)), and passenger-relevant information among others. As shown in FIG. 3A, the vehicle HMI 306 may include user interface objects 308-322. The functions associated with each user interface object 308-322 may be executed from user input via the touchpad 108. In some embodiments, the user interface objects 308-322 may be associated with applications that may be executed and stored, for example, by the head unit 106. In additional embodiments, the vehicle HMI 306 may extend to be presented on the meter display within the vehicle 102 that may include matching user interface objects to the user interface objects 308-322 or one or more alternate user interface objects.

In one or more embodiments, the vehicle HMI 306 may be divided into different areas for displaying one or more of the user interface objects 308-322. For example, in FIG. 3A, zone A and zone B are shown. The zone A and zone B may present one or more different types of sub-interfaces of the vehicle HMI 306 that may pertain to different operating systems, applications, vehicle systems, and the like. For example, as shown, zone A may present a first sub-interface displaying the user interface objects 308-318 that include icons that may be inputted to map to higher level functions and/or systems of the vehicle 102. Additionally, as shown zone B may present a second sub-interface that presents user interface objects 320, 322 that pertain to a specific user interface, application, and/or vehicle system. For example, as shown in FIG. 3A, zone B presents user interface objects 320, 322 that pertain to an audio system of the vehicle 102. As described in more detail below, one or both zone A and zone B of the vehicle HMI 306 may be presented with a respective background graphic animations and the one or more user interface objects 308-322 may be presented with respective UI objects graphic animations that may be presented in a variety of formats based on one or more touch inputs provided by the user 138 on the touchpad 108.

With continued reference to FIG. 3A, when absolute coordinate mapping is utilized between the touchpad 302 and the display screen 304, touchpad coordinates that correspond to the display coordinate areas on the display screen 304 where the user interface objects 308-322 are presented are utilized as active touchpad coordinate areas 324-338. In other words, the touchpad 302 may be utilized to directly input the user interface objects 308-322 when the user 138 touch inputs the portion of the surface 140 of the touchpad 302 at the active touchpad coordinate areas 324-338. For example, if the user's finger touches the surface 140 of the touchpad 302 at the active touchpad coordinate area 326, the touch input will be registered at the corresponding display coordinate areas of the display screen 304 presenting user interface object 310 that pertains to "connection" in order to execute connections of the vehicle 102.

Additionally, based on data provided to the coordinate touch recognition module 130 by the user interface management module 124 based on the plurality of zones of the vehicle HMI 306, the touchpad 302 may virtually be divided into two areas, zone A and zone B, which both map to respective areas of the vehicle HMI presented on the display screen 304. Specifically, zone A of the touchpad 302 may be mapped to zone A of the vehicle HMI 306 such that any inputs received on the touchpad 302 at zone A will be absolutely mapped to a corresponding location at zone A of the vehicle HMI 306 presented on the display screen 304. Similarly, zone B of the touchpad 302 may be mapped to zone B of the vehicle HMI 306 such that any inputs received on the touchpad 302 at zone B will be absolutely mapped to a corresponding location at zone B of the vehicle HMI 306 presented on the display screen 304. In some embodiments, each zone is independently clickable. For example, the user 138 may rest their finger on zone A of the touchpad 302 to provide a first input and push down with their finger causing a click to provide a second input. The user 138 may also place their finger on zone B of the touchpad 302 to provide a third input and push down with the finger causing a click to provide a forth input.

In some embodiments, the user 138 may provide inputs based on utilizing an angle of the user's finger, such that an input that is registered as a right sided input may be provided with a right hand or a right side of the user's finger, and an input that is registered as a left sided input may be provided with a left hand or a left side of the user's finger. Additionally, the user may provide swiping inputs or scrolling inputs that may include left/right sided swiping inputs or left/right sided scrolling inputs that may be registered as a respective left/right sided input. It is to be appreciated that these inputs are in addition to other gesture related inputs (e.g., moving the finger while it is resting on the touchpad 302) that may be completed on the touchpad 302. In an exemplary embodiment, the types of inputs provided by the user 138 that include the angle, direction, position of the touch input may be aggregated by the coordinate touch recognition module 130 as the touchpoint data and may further be provided to the user interface management module 124 of the head unit 106.

In an exemplary embodiment, once the user 138 provides one or more touch inputs on the one or more user interface objects 308-322 of the vehicle HMI 306, the coordinate touch recognition module 130 may communicate the one or more touchpad coordinates to the user interface management module 124 along with the touchpoint data. The user interface management module 124 may register the user input(s) and the controller 120 may send one or more commands based on the user input. In an alternate embodiment, once the coordinate touch recognition module 130 determines that the touch input occurs on one of the active touchpad coordinate areas 324-338, the coordinate touch recognition module 130 may send the absolute mapped touchpad coordinate values as a user input to the user interface management module 124. This data may be analyzed and sent to the background animation module 126 and the UI object animation module 128 to provide respective graphic animations at specific portions of the vehicle HMI that are based on absolute coordinate mapping.

Figure 3B:
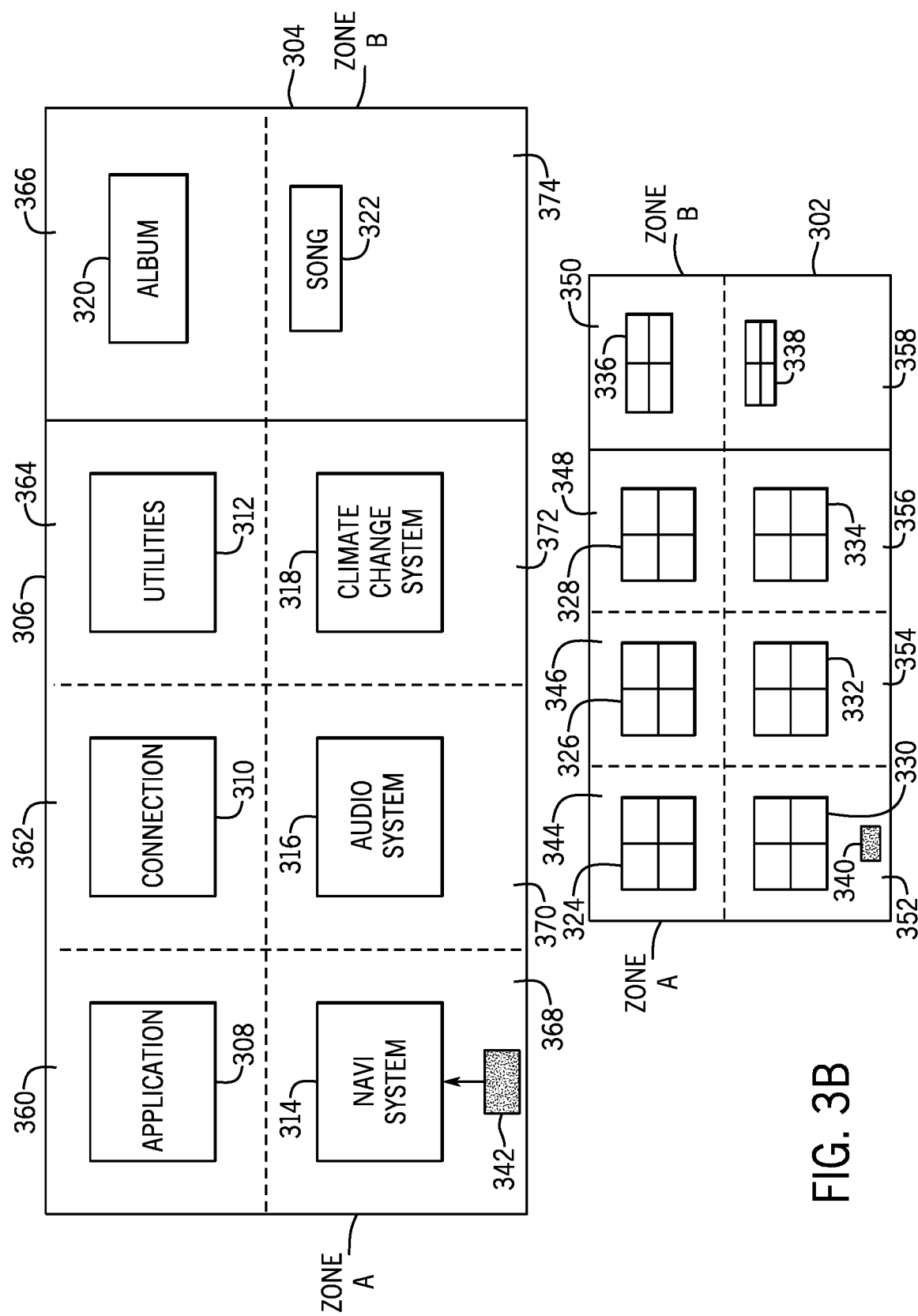
FIG. 3B is a view illustrating zone coordinate mapping between the touchpad and a display screen presenting the vehicle HMI, according to an exemplary embodiment.

FIG. 3B is a view illustrating zone coordinate mapping between the touchpad 108 and the display screen 110 presenting the vehicle HMI 306, according to an exemplary embodiment. FIG. 3B illustrates the display screen 304 and the touchpad 302 utilizing a simplified coordinate scale for the purposes of providing a simplistic example of absolute coordinate mapping with zone mapping input between the touchpad 302 and the display screen 304. In an exemplary embodiment, the user 138 may be able to switch the system 100 (e.g., via a user interface input switch) between the absolute coordinate mapping mode (described above with reference to FIGS. 2 and 3A) and an zone coordinate mapping mode (described in reference to FIG. 3B). In one embodiment, the zone coordinate mapping mode allows the user to quickly and efficiently provide one or more touch inputs to user interface objects 308-322 by touching any portion of the touchpad 302. In other words, zone coordinate mapping mode allows the user 138 to provide inputs to one or more user input objects 308-322 displayed on the display screen 304, even if the touch input does not occur at active touchpad coordinate areas 324-338 of the touchpad 302. For example the user 138 may be able to provide inputs to user interface objects 308-322 of the vehicle HMI 306 without having to specifically touch the touchpad 302 at active touchpad coordinate areas 324-338 (as was described above with reference absolute coordinate mapping in FIG. 3A).

As illustrated in the example shown in FIG. 3B, the user 138 may provide a touch input 340 on the surface 140 of the touchpad 302 that is outside of the active touchpad coordinate areas 324-338. In the absolute coordinate mapping mode, the touch input 340 is presented as the input indicator 342 that is presented at an absolute coordinate position of the touch input 340 on the display screen 304. Also in the absolute coordinate mapping mode, since the touch input 340 is not received on any one of the active touchpad coordinate areas 324-338 corresponding to the user interface objects 308-322, an input is not received on any one of the user interface objects 308-322. In other words, the input indicator 342 corresponding to the touch input 340 is presented at a portion of the display screen 110 that does not contain any user interface objects, such as the user interface objects 308-322. Therefore, the touch input 340 will have no effect on the vehicle HMI 306 displayed on the display screen 304.

However, in an exemplary embodiment, when the system 100 is in the zone coordinate mapping mode, the touch input received in areas of the surface 140 of the touchpad 108 that are not determined to be active touchpad coordinates of the touchpad 108 (that are not mapped via absolute coordinate mapping to user interface objects 308-322) may also be utilized to provide inputs to the user interface objects 308-322 presented on the vehicle HMI 306 (in addition to the active touchpad coordinate areas 324-338). For example, as depicted in FIG. 3B, zone coordinate mapping allows the user to efficiently provide the touch input 340 to the user interface object 314 without the user having to specifically touch input the active touchpad coordinate area 330 corresponding to the user interface object 314. Therefore, the touch input 340 at touch input zone 352 that corresponds to the placement of input indicator 342 within display input zone 368 is utilized to provide a user input to the user interface object 314. As shown, display input zones 360-374 may be provided that are associated to each of the user interface objects 308-322 and that correspond to touch input zones 344-358 via zone coordinate mapping. The touch input zones 344-358 may be utilized to provide inputs to the user interface objects 308-322 without the user having to specifically input the active touchpad coordinate areas 324-338. It is to be appreciated that the zone coordinate mapping may be executed in a dynamic matter based on the layout of the user interface(s) presented on the display screen 110. For example, if the vehicle HMI 306 includes only one user interface object 308, then the zone coordinate mapping may include the touch input zone 344 as utilizing the entirety of the touchpad 302. Similarly, if the vehicle HMI 306 includes two user interface objects 308, 310 then the zone coordinate mapping may include the touch input zones 344, 346 that may each respectively each utilize half of the entirety of the touchpad 302.

In an exemplary embodiment, the size and placement of the display input zones are determined by the user interface management module 124 upon receiving data from the coordinate display recognition module 114 that indicate the display coordinates of the input indicator 342 with respect to the user interface objects 308-322 presented on the vehicle HMI 306. In an alternate embodiment, the size and placement of touch input zones 344-358 are determined by the user interface management module 124 upon receiving data from the coordinate touch recognition module 130 that indicates the active touchpad coordinate areas 324-338 of the touchpad 302 with respect to the user interface objects 308-322 presented on the vehicle HMI 306.

In one embodiment, the user interface management module 124 may determine the size and placement of the display input zones 360-374 by calculating display coordinates that are located within a determined measured distance from the display coordinates that include the edges of the user interface objects 308-322 displayed on the display screen 304. For example, the user interface management module 124 may determine the size and placement of the display input zones 360-374 by measuring the shortest distance from the display coordinates that include the edges of any of the user interface objects 308-322 to the remaining display coordinates of the display screen 304.

In an alternate embodiment, the user interface management module 124 may determine the size and placement of the display input zones 360-374 by calculating display coordinates that are located within a determined measured distance from the display coordinates that include the center point of the user interface objects 308-322 displayed on the display screen 304. For example, the user interface management module 124 may determine the size and placement of the display input zones 360-374 by measuring the shortest distance from the display coordinates that include the center point of any of the user interface objects 308-322 to the remaining display coordinates of the display screen 304.

Upon determining the display input zones 360-374, the user interface management module 124 may evaluate the display coordinates of the input indicator 342 (provided by the coordinate display recognition module 114) to determine which of the user interface objects 308-322 are to be selected/inputted based off of the touch input received at one of the corresponding touch input zones 344-358. For example, as shown, the input indicator 342 corresponding to the touch input 340 is determined to be presented within display input zone 368 and is utilized to provide the user input to user interface object 314.

Figure 4A:
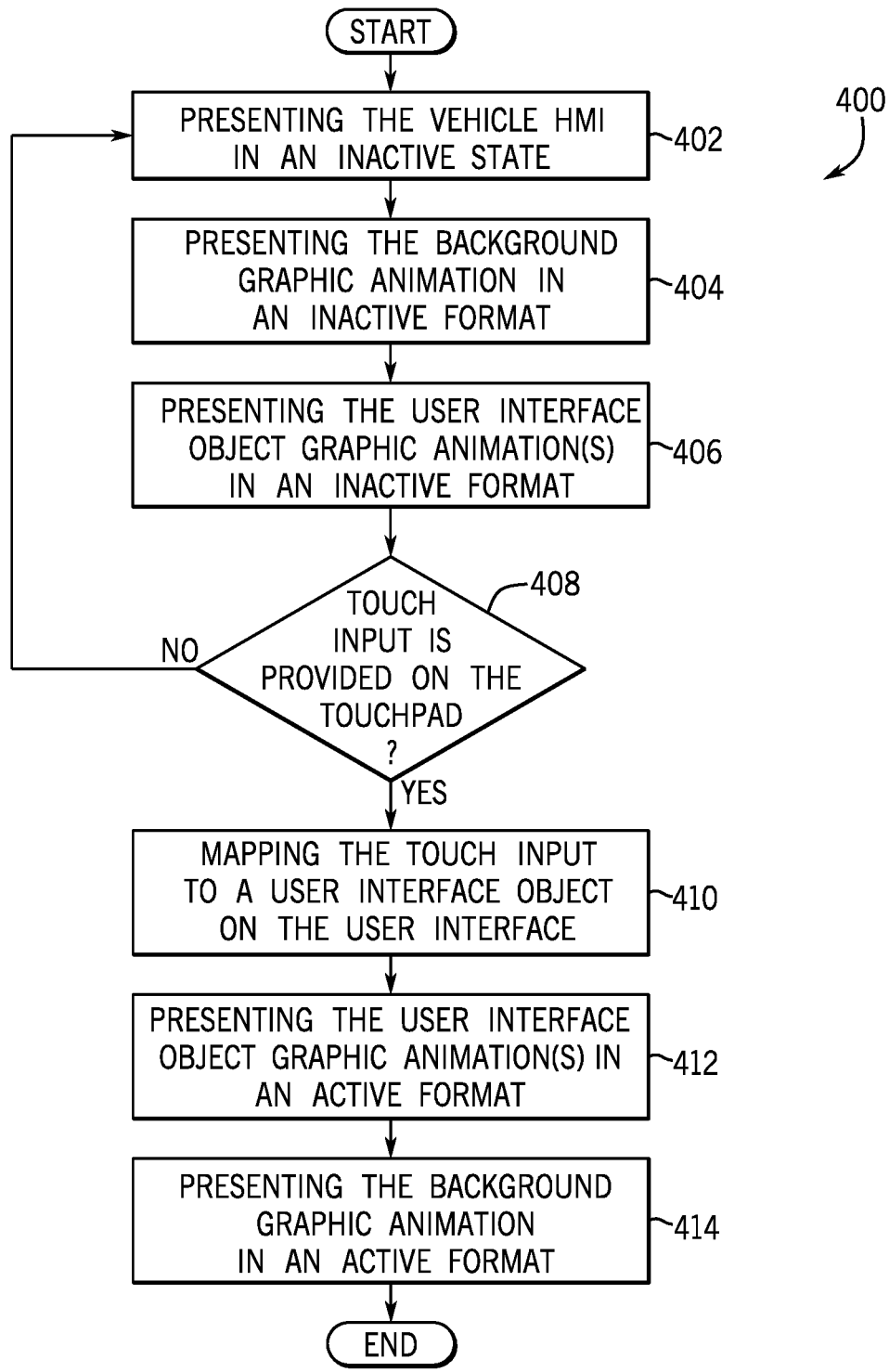
FIG. 4A illustrates an exemplary method for providing absolute and zone coordinate mapping with user interface object and background graphic animations from the operating environment of FIG. 1 according to an exemplary embodiment.
Figure 4B:
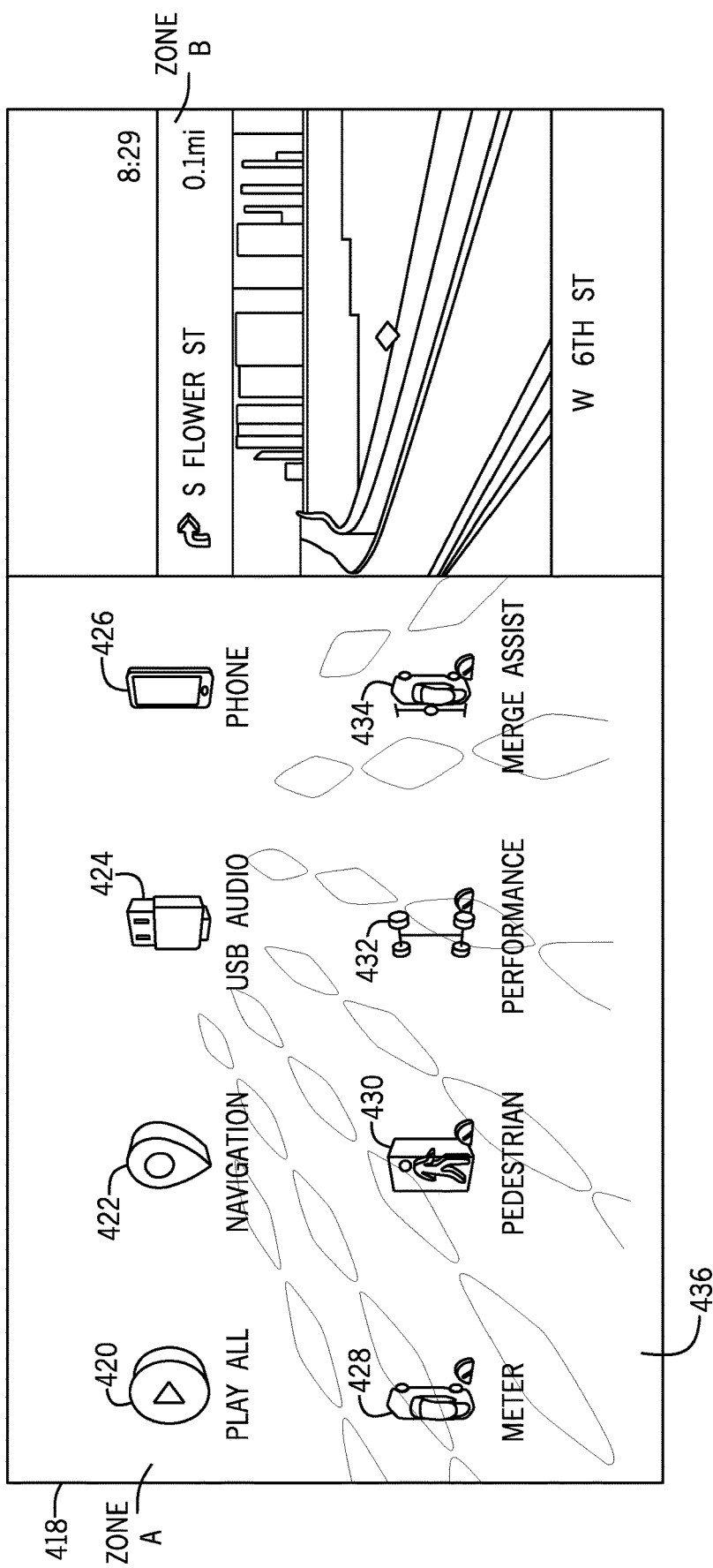
FIG. 4B is an exemplary illustration of the vehicle HMI that is presented in an inactive state, according to an exemplary embodiment.

FIG. 4A illustrates an exemplary method 400 for providing absolute and zone coordinate mapping with user interface object and background graphic animations from the operating environment of FIG. 1 according to an exemplary embodiment. The method 400 may begin at block 402 wherein the method 400 includes presenting the vehicle HMI in an inactive state. Referring to FIG. 4B is an exemplary illustration of the vehicle HMI that is presented in the inactive state, according to an exemplary embodiment, the vehicle HMI 418 may be presented on the display screen 110 of the display unit 104 based on communication of data to the coordinate display recognition module 114 by the user interface management module 124. More specifically, the user interface management module 124 may retrieve data from the storage 118 of the head unit 106 that pertains to the vehicle HMI 418 and may communicate that data with the display unit 104 to display the vehicle HMI 418.

In one embodiment, the vehicle HMI may be presented by the user interface management module 124 in the inactive state after the vehicle 102 has been enabled (e.g., turned on) and the vehicle HMI may remain in the inactive state until the coordinate touch recognition module 130 determines that the user 138 has provided a touch input to the touchpad 108. In another embodiment, the vehicle HMI 418 may be presented in the inactive state when it is determined that the user 138 has not provided a touch input on the touchpad 108 for a predetermined amount of time. More specifically, after the user 138 provides one or more touch inputs on the touchpad 108 that are mapped based on absolute coordinate mapping or zone coordinate mapping to one or more display coordinates of the display unit 104 and at least one user interface object (e.g., the user interface object pertaining to the function "play all") of the vehicle HMI 418, the user interface management module 124 may start the predetermined timer which may include a default or user customized period of time that may expire at which point the vehicle HMI 418 may be presented in the inactive state (from the active state).

With reference again to FIG. 4A, upon presenting the vehicle HMI in the inactive state (at block 402), at block 404, the method 400 may include presenting the background graphic animation in an inactive format. In an exemplary embodiment, as shown in FIG. 4B, within the inactive state the vehicle HMI 418 may include a user interface object input zone (zone A) and an application specific object input zone (zone B), similar to the configuration of the vehicle HMI 306 described above with respect to FIG. 3A and FIG. 3B. In one embodiment, the user interface management module 124 may send and receive one or more signals to the background animation module 126 that may represent indication that the vehicle HMI 418 will be presented in the inactive state. Upon receipt of the one or more signals, the background animation module 126 may send one or more response signals to the user interface management module 124 to present the background graphic animation 436 in the inactive format.

In an exemplary embodiment, as shown in FIG. 4B, the background graphic animation 436 may be presented within zone A of the vehicle HMI 418 while a vehicle application or system specific data may be presented within zone B of the vehicle HMI 418. In some embodiments, the background graphic animation 436 may be presented within both zone A and zone B of the vehicle HMI 418. In additional embodiments, the background graphic animation 436 may be presented in two different manners or formats within zone A and zone B within the inactive state. In alternate embodiments, the background graphic animation 436 may include a user selected customized graphic animation that may be selected from list of pre-stored animations or that may be downloaded from an external storage (not shown) or an internet cloud (not shown).

In one or more embodiments, within the inactive format, the background graphic animation 436 may be presented as a moving graphic that may include the one or more different types and sizes of features that include shapes, patterns, illustrations, pictures, colors, and the like that may be presented as a changing feature to move in one or more directions. The one or more features may be presented as matching sized objects that are located equidistant from one another. As an illustrative example, with continued reference to FIG. 4B, the background graphic animation 436 may include a diamond shaped pattern that is directed in a particular direction and that may change as the vehicle HMI 418 is being presented in the inactive state. In some configurations, the moving pattern of the background graphic animation 436 may move or change according to any animated behavior and/or movement. For instance, the background graphic animation 436 may move back and forth behind UI object graphic animations 420-434 being presented on the vehicle HMI 418 via the display unit 104. Additionally, shapes included within the background graphic animation 436 may change in size or format and/or may be modified into alternate shapes as the background graphic animation 436 is presented in the inactive format.

In some embodiments, the motion of the moving graphic may be set to one or more predetermined speeds during the inactive state of the vehicle HMI 418. For example, the diamond pattern of the background graphic animation 436 shown in FIG. 4B may be presented to move from one portion of the vehicle HMI 418 to another portion of the vehicle HMI 418 in a slow speed during the inactive format that may increase and/or decrease over a predetermined amount of time as the background graphic animation continues to be presented in the inactive format. In some embodiments, during the inactive format, the background graphic animation 436 may be presented as a stationary (motionless) graphic that may include the one or more different aforementioned features.

Referring again to the method 400 of FIG. 4A, upon presenting the background graphic animation in the inactive format (at block 404), at block 406, the method 400 may include presenting the user interface object graphic animation(s) in an inactive format. In one embodiment, within the inactive state, the user interface management module 124 may send and receive one or more signals to and from the UI object animation module 128 that may represent indication that the vehicle HMI 418 will be presented in the inactive state. As shown in FIG. 4B, upon receipt of the one or more signals, the UI object animation module 128 may send one or more response signals to the user interface management module 124 to present the one or more UI object graphic animations 420-434 in the inactive format.

In an exemplary embodiment, as shown in FIG. 4B, the one or more UI object graphic animations 420-434 may be presented within zone A of the vehicle HMI 418 while a vehicle application or system specific data may be presented within zone B of the vehicle HMI 418. In some embodiments, the one or more UI object graphic animations 420-434 may be presented within both zone A and zone B of the vehicle HMI 418. In additional embodiments, the one or more UI object graphic animations 420-434 may be presented in two different manners or formats within zone A and zone B. In additional embodiments, the one or more UI object graphic animations 420-434 may include a user selected customized graphic animation that may be selected from list of pre-stored animations or that may be downloaded from an external storage (not shown) or an internet cloud (not shown).

In some embodiments, the UI object animation module 128 may not present the one or more UI object graphic animations 420-434 until the user 138 provides an initial "wake-up" touch input to the touchpad 108. The "wake-up" touch input may include a simple touching, resting or tapping touch input that is provided on the surface 140 of the touchpad 108 to indicate that the user 138 may provide one or more touch inputs to select one or more of the user interface objects being presented on the vehicle HMI 418. In other words, initially during the inactive state, the vehicle HMI 418 may only be presented with the background graphic animation 436 that may or may not include the presentations of zone A and/or zone B until the user 138 provides the "wake-up" touch input to the touchpad 108. In some embodiments, initially during the inactive state, the vehicle HMI 418 may be presented as a screen saver that is presented in a dimmed manner that may only be presented with the background graphic animation 436 until the user 138 provides the "wake-up" touch input to the touchpad 108. Within these embodiments, upon the reception of the "wake-up" touch input by the touchpad 108, the user interface management module 124 may send one or more respective signals to the UI object animation module 128 based on data received from the touchpad communication device 132 and the UI object animation module 128 may present the one or more UI object graphic animations 420-434 in the inactive format.

In an exemplary embodiment, as shown in FIG. 4B, within the inactive format, the one or more UI object graphic animations 420-434 may be presented in a three-dimensional format that may include an illustration representing a context of a function that each respective user interface object may be inputted to execute. Additionally, the one or more UI object graphic animations 420-434 may be presented in an angled format, at a first angle. For example, as shown in FIG. 4B, the one or more UI object graphic animations 420-434 may be presented at a 45 degree angle. In some embodiments, the background animation module 126 may communicate with the UI object animation module 128 to determine a direction of movement of the features of the background graphic animation 436. Upon determining the direction of movement of the features of the background graphic animation 436, the UI object animation module 128 may present the one or more UI object graphic animations 420-434 in the angled format in a direction that corresponds to the direction of the features of the background graphic animation 436.

In an alternate embodiment, within the inactive format, the one or more UI object graphic animations 420-434 may be presented in a two-dimensional format that may be presented in an angled or non-angled format. As discussed below (with reference to FIG. 4C), as the user provides one or more user inputs to select one of the one or more user interface objects, the selected user interface object(s) may no longer be presented in the inactive format, while one or more un-selected user interface objects may continue to be presented in the inactive format.

Referring once again to method 400 of FIG. 4A, at block 408, the method 400 may include determining if the user 138 provides at least one touch input on the touchpad 108. In an exemplary embodiment, the user interface management module 124 may determine that the user 138 provides at least one touch input on the touchpad 108 based on the receipt of data corresponding to the touch input from the coordinate touch recognition module 130. Upon determining that at least one touch input is provided on the touchpad 108 (at block 408), at block 410, the method 400 may include mapping the touch input to a user interface object on the user interface.

In one embodiment, (as described above with respect to FIG. 3A), absolute coordinate mapping may be utilized to map the touch input(s) provided by the user 138 to the user interface objects presented on the vehicle HMI 418, as shown in FIG. 4B. More specifically, when the absolute coordinate mapping mode is utilized between the touchpad 108 and the display screen 110, touchpad coordinates that correspond to the display coordinate areas on the display screen 110 where the user interface objects are presented are utilized as active touchpad coordinate areas. In other words, the touchpad 302 may be utilized to directly input the user interface objects presented on the vehicle HMI 418 when the user 138 touches the portion of the surface 140 of the touchpad 302 at respective active touchpad coordinate areas.

Upon receiving at least one or one or more touch inputs at a specific portion of the touchpad 108, the touchpad communication device 132 may register the one or more touch inputs and may provide the touch pad coordinates of the touch input(s) to the user interface management module 124 along with touchpoint data that corresponds to the manner of the touch input(s) that include, but are not limited to, touch input position(s), touch input speed, a touch input direction(s), a touch input angle(s), and the like. The user interface management module 124 may communicate with the touchpad 108 and the display unit 104 and determine one or more specific portions of the vehicle HMI 418 where the absolute mapped position of the touchpoint(s) corresponds to the one or more user interface objects presented on the vehicle HMI 418. In one embodiment, based on the absolute coordinate mapping, the user interface management module 124 may determine the selection of one of the one or more user interface objects by the user 138 based on the touch input(s) provided by the user 138. For example, the user 138 may use their finger to providing a sliding touch input to the touchpad 108 to scroll from one user input object to another. As the user 138 touches the absolute mapped portions of the surface 140 of the touchpad 108, the user interface management module 124 may determine the selection of respective user interface objects based on display coordinates that include user interface objects that are absolute mapped to the portions of the surface 140.

In an alternate embodiment, (as described above with respect to FIG. 3B), zone coordinate mapping may be utilized to map the touch input(s) provided by the user 138 to the user interface objects presented on the vehicle HMI 418, as shown in FIG. 4B. More specifically, when the zone coordinate mapping mode is utilized, the touch input received in areas of the surface 140 of the touchpad 108 that are not determined to be active touchpad coordinates of the touchpad 108 (that are not mapped via absolute coordinate mapping to user interface objects of the vehicle HMI) may also be utilized to provide inputs to the user interface objects of the vehicle HMI.

Upon receiving at least one or one or more touch inputs at a specific portion of the touchpad 108, the touchpad communication device 132 may register the one or more touch inputs and may provide the touch pad coordinates of the touch input(s) to the user interface management module 124 along with touchpoint data that corresponds to the manner of the touch input(s). The user interface management module 124 may communicate with the touchpad 108 and the display unit 104 and may determine one or more specific portions of the vehicle HMI 418 where the zone mapped position of the touchpoint(s) corresponds to the one or more user interface objects presented on the vehicle HMI 418. In one embodiment, based on the zone coordinate mapping, the user interface management module 124 may determine the selection of one of the user interface objects based on the touch input(s) provided by the user 138. For example, the user 138 may use their finger to provide the sliding touch input to the touchpad 108 to scroll from one user input object to another. As the user 138 touches the zone mapped portions of the surface 140 of the touchpad 108, the user interface management module 124 may determine the selection of respective user interface objects based on display coordinates that are within respective display input zones that include user interface objects.

Upon mapping the touch input(s) to at least one user interface object of the user interface (at block 410), at block 412, the method 400 may include presenting the user interface object graphic animation(s) in an active format. Referring now to FIG. 4C an exemplary illustration of the vehicle HMI 418 that is presented in the active state, according to an exemplary embodiment, upon receiving data from the coordinate touch recognition module 130 with respect to the touchpad coordinates of the touch input(s) and the touchpoint data pertaining to the touch input(s), the user interface management module 124 may modify the vehicle HMI 418 into the active state. In an exemplary embodiment, the vehicle HMI 418 may continue to be presented within zone A of the vehicle HMI 418 while a vehicle application or system specific data may be presented within zone B of the vehicle HMI 418.

In one embodiment, the user interface management module 124 may send one or more signals to the UI object animation module 128 that are indicative of the selected user interface object to which the touch input(s) is mapped via absolute coordinate mapping or zone coordinate mapping (as discussed above with respect to block 410 of method 400). In one embodiment, the UI object animation module 128 may provide one or more response signals to the user interface management module 124 to present the UI object graphic animation that pertains to the selected user interface object on the vehicle HMI 418.

The vehicle HMI 418 may be presented on the display screen 110 and respective touchpoint data may be provided by the coordinate touch recognition module 130 to the user interface management module 124. As discussed, the user interface management module 124 may provide one or more signals to the UI object animation module 128 that are indicative of the touchpad coordinates of the touch input(s) and the touchpoint data. In an exemplary embodiment, the UI object animation module 128 may interpret the one or more signals sent from the user interface management module 124 to present the UI object graphic animation 432 that corresponds to the selected user interface graphic object, as determined based on the absolute coordinate mapping or the zone coordinate mapping.

With continued reference to FIG. 4C, as the user 138 utilizes the touchpad 108 to provide touch inputs to swipe/scroll through the selection of the user interface objects, the user interface management module 124 may determine respective user interface objects that are being selected by the touch inputs being provided by the user 138 based on the utilization of the absolute touch coordinate mapping or the zone coordinate mapping. For example, the user 138 may provide a touch input(s) that includes a swiping left/right motion on the touchpad 108 to select through user interface objects of the vehicle HMI 418. Data pertaining to the touchpad coordinates of each input and the touchpoint data that may include data pertaining to the swiping motion and the direction of the swiping motion may be interpreted by the user interface management module 124 and communicated to the UI object animation module 128. The UI object animation module 128 may interpret the selected user interface object and may present the UI object graphic animation 432 in the active format corresponding to the selected user interface object pertaining to the function "performance".

In an exemplary embodiment, if the one or more UI object graphic animations 420-434 were previously presented in the three-dimensional arrangement within the inactive format (as shown in FIG. 4B), the UI object graphic animation 432 of the selected user interface object may be presented in a two-dimensional arrangement within the active format that may include an illustration representing a context of each respective user interface object. Additionally, the UI object graphic animation 432 of the selected user interface object may be presented in a different second angle to stand out from the other non-selected user interface objects that include UI object graphic animations that continue to be presented in the first angle within the inactive format. As shown in FIG. 4C, the UI object graphic animations 420-430, 434 that correspond to the non-selected user interface objects may continue to be presented in the inactive format at a 45 degree angle while the UI object graphic animation 432 corresponding to the selection of the user interface object "performance" is presented at zero degrees (e.g., facing forward).

In some embodiments, the UI object graphic animation 432 of the selected user interface object may be presented in a second angle and a direction that corresponds to the direction of the touch input provided by the user 138 on the surface 140 of the touchpad 108. More specifically, the UI object animation module 128 may determine the direction and angle of the UI object graphic animation 432 based on the touchpoint data received and analyzed by the user interface management module 124 that may indicate the direction of touch, the angle of touch, the direction of swiping, etc. provided by the user 138. Upon determining the direction of the touch input, the UI object animation module 128 may present the UI object graphic animation 432 corresponding to the selected user interface object in the angled format in a direction that corresponds to the direction of the touch input provided by the user 138.

In an alternate embodiment, if the one or more UI object graphic animations 420-434 were previously presented in the two-dimensional arrangement within the inactive format, the UI object graphic animation 432 of the selected user interface object may be presented in a three-dimensional arrangement within the active format that may include an illustration representing a context of each respective user interface object. For example, if the UI object graphic animation 432 is presented in the three-dimensional arrangement within the active format, the other UI object graphic animations 420-430, 434 associated with the other user interface objects on the vehicle HMI 418 may be presented in the two-dimensional format within the inactive format.

In an exemplary embodiment, the UI object animation module 128 may additionally present a touch graphic indicator above the selected user interface object. As shown in FIG. 4C, the touch graphic indicator 438 may be presented above the UI object graphic animation 432 of the selected user interface object pertaining to the "performance" function to provide indication that the associated user interface object pertaining to the "performance" function is highlighted for possible input to execute the "performance" function. In one embodiment, as shown, the touch graphic indicator 438 may include a highlighted partially boxed portion that is presented above the UI object graphic animation 432. In additional embodiments, the touch graphic indicator 438 may be configured in various shapes, colors, shades, formats, and the like and may be presented as partially above, below, partially below, bordering, and or circling the UI object graphic animation 432 that corresponds to the selected user interface object on the vehicle HMI 418.

With continued reference to FIG. 4C, as the user 138 provides touch inputs to the touchpad 108 (e.g., by dragging a finger across the surface 140 of the touchpad 108), additional user interface objects may be selected and the UI object graphic animation 432 may again be presented in the inactive format when the corresponding user interface object of the "performance" function is not selected. For example if the user 138 drags their finger to the left on the surface 140 of the touchpad 108, the user interface object pertaining to the "pedestrian" function may be presented with the UI object graphic animation 430 presented in the active format with the touch graphic indicator 438 presented above it.

Referring again to the method 400 of FIG. 4A, upon presenting the user interface object graphic animation(s) in the active format (at block 412), at block 414, the method 400 may include presenting the background graphic animation in an active format. In an exemplary embodiment, upon receiving data from the coordinate touch recognition module 130 with respect to the touchpad coordinates of the touch input(s) and the touchpoint data pertaining to the touch input(s), the user interface management module 124 may send one or more signals to the background animation module 126 that are indicative of the selected user interface object to which the touch input(s) is mapped, via absolute coordinate mapping or zone coordinate mapping (as discussed above with respect to block 410 of method 400). In particular, the user interface management module 124 may send the one or more signals to the background animation module 126 that are indicative of the touchpad coordinates of the touch input(s) and the touchpoint data. In an exemplary embodiment, the background animation module 126 may interpret the one or more signals received from the user interface management module 124 to present the background graphic animation in the active format. In an exemplary embodiment, the background graphic animation 436 in the active format is presented at a location of the vehicle HMI 418 that corresponds to the selected/highlighted user interface graphic object.

In an exemplary embodiment, the background animation module 126 may present the background graphic animation 436 corresponding to the selected user interface as a moving graphic that may include the one or more different types and sizes of features that include shapes, patterns, illustrations, pictures, colors, and the like that may be consistent with the presentation of the features (e.g., shapes) presented in the inactive format. In another embodiment, the background graphic animation 436 corresponding to the selected user interface object may be included as a moving graphic that may include one or more different types and sizes of features than when in the inactive format. Additionally, if the background graphic animation 436 is presented as the stationary (motionless) graphic within the inactive format, the background graphic animation may be modified to be presented as a moving graphic within the active format. For example, the background graphic animation 436 may be presented in a stationary pattern of diamond shapes within the inactive format that may be modified into moving circular shapes within the active format.

With reference to FIG. 4C, as the user 138 utilizes the touchpad 108 to provide touch inputs to swipe through the selection of the user interface objects, based on the utilization of absolute touch coordinate mapping or zone coordinate mapping mode, the user interface management module 124 may determine respective user interface objects that are being selected based on the touch inputs being provided by the user 138. For example, the user 138 may provide a touch input that includes a swiping left/right motion on the touchpad 108 to scroll through the user interface objects of the vehicle HMI 418. In one embodiment, data containing the touchpad coordinates of each touch input provided by the user 138 and the associated touchpoint data may be evaluated by the user interface management module 124 to determine the swiping motion and the direction of the swiping motion. The user interface management module 124 may communicate the swiping motion and direction of the swiping motion to the background animation module 126. In one or more embodiments, the background animation module 126 may present the background graphic animation 436 in the active format corresponding to the selected user interface object mapped to the touchpoint, based on the utilization of absolute coordinate mapping or zone coordinate mapping (as discussed with respect to block 410 of the method 400).

In an exemplary embodiment, the background animation module 126 may present the background graphic animation 436 with a focal point that corresponds to the selected user interface object such that the background graphic animation 436 may be presented as a hovering effect emitting out from the UI object graphic animation 432 corresponding to the selected user interface object. As shown in FIG. 4C, the background animation module 126 may present the background graphic animation 436 with the hovering effect included in a circular shape that is presented as emitting out from (e.g., out of) the UI object graphic animation 432 of the selected user interface object pertaining to the "performance" function.

In another embodiments, the UI object graphic animation 432 of the selected user interface object may be presented with changing locations such that the background graphic animation 436 may be presented above/ahead of the UI object graphic animation 432 and may be modified to be presented behind/below the UI object graphic animation 432 while the background graphic animation 436 is in the active format. In an alternate embodiment, the background animation module 126 may present the background graphic animation 436 with a bursting effect that includes illustration of the UI object graphic animation 432 appearing to burst out towards the user 138 viewing the display screen 110 in a repeated fashion.

In one or more embodiments, the background animation module 126 may modify the features of the background graphic animation 436 that include the shapes, patterns, illustrations, pictures, colors, and the like of the background graphic animation 436 based on the direction of the touch input provided by the user 138 on the surface 140 of the touchpad 108. More specifically, the background animation module 126 may determine the direction and angle of the presentation of the features of the background graphic animation 436 based on the touchpoint data received and analyzed by the user interface management module 124 (that may indicate the direction of touch, the angle of touch, the direction of swiping, etc. provided by the user 138). Upon determining the direction of the touch input, the background animation module 126 may present the background graphic animation at the location of the vehicle HMI 418 that corresponds to the selected user interface object with a pattern that includes shapes that are angled in a direction that corresponds to the direction of the touch input provided by the user 138. As an illustrative example, when the background graphic animation 436 is presented as a pattern of diamond shaped objects that are emitting from the UI object graphic animation 432 the angle at which the diamond shaped objects are emitting from the UI object graphic animation 432 may change based on the direction of the touch input provided by the user 138. For example, the diamond shaped objects may be presented at an angle to make the objects appear as if they are being emitted towards a right direction if the user 138 provides touch input with their right handed finger and vice versa.

In one embodiment, the features of the background graphic animation 436 may be presented as being scaled and/or adjusted with respect to speed based on the position of the touch input on the touchpad 108. In particular, the size of the shapes of the background graphic animation 436 and/or the motion of the moving graphic may be adjusted based on touchpoint data evaluated by the background animation module 126. For example, the diamond pattern of the background graphic animation 436 shown in FIG. 4C may be presented to increase in size based on a touch input that may registered with a high amount of pressure. Additionally, the diamond shaped objects presented as appearing further away from the user 138 viewing the display screen 110 may be presented at a slower speed than diamond shaped objects presented as appearing closer to the user 138 based on the touch input provided by the user 138.

In some embodiments, the speed of the moving graphic of the background graphic animation 436 may increase as the selected user interface object remains selected for a predetermined period of time to indicate to the user 138 that the particular user interface object has been selected for a certain period of time and may be inputted to execute the corresponding function. In additional embodiments, during the active format, scaling and/or adjustment of features with respect to speed may occur with a period of brief delay such that the features of background graphic animation 436 are presented in a similar fashion to how they were previously presented in the inactive format during the period of the brief delay. Upon completion of the period of the brief delay, the scaling and/or adjustment of features with respect to speed may occur to indicate to the user 138 that the user interface object corresponding to the location of the background graphic animation 436 has been selected for a certain period of time and may be inputted to execute the corresponding function.

With continued reference to FIG. 4C, as the user 138 provides touch inputs to the touchpad 108 (e.g., by dragging a finger across the surface 140 of the touchpad 108), additional user interface objects may be selected and the background animation module 126 may move the background graphic animation 436 from the location of the vehicle HMI 418 that corresponds to the one user interface object to another location as the user interface object pertaining to the "performance" function is not selected. In other words, the background graphic animation 436 may be controlled to move from a previously selected user interface object to a next selected user interface object as the user 138 swipes or drags their finger across the surface 140 of the touchpad 108. For example, if the user 138 drags their finger to the left on the surface 140 of the touchpad 108, the user interface object pertaining to the "pedestrian" function may be presented with the background graphic animation 436 emitting from the UI object graphic animation 430 presented in the active format with the touch graphic indicator 438 presented above it.

Figure 5:
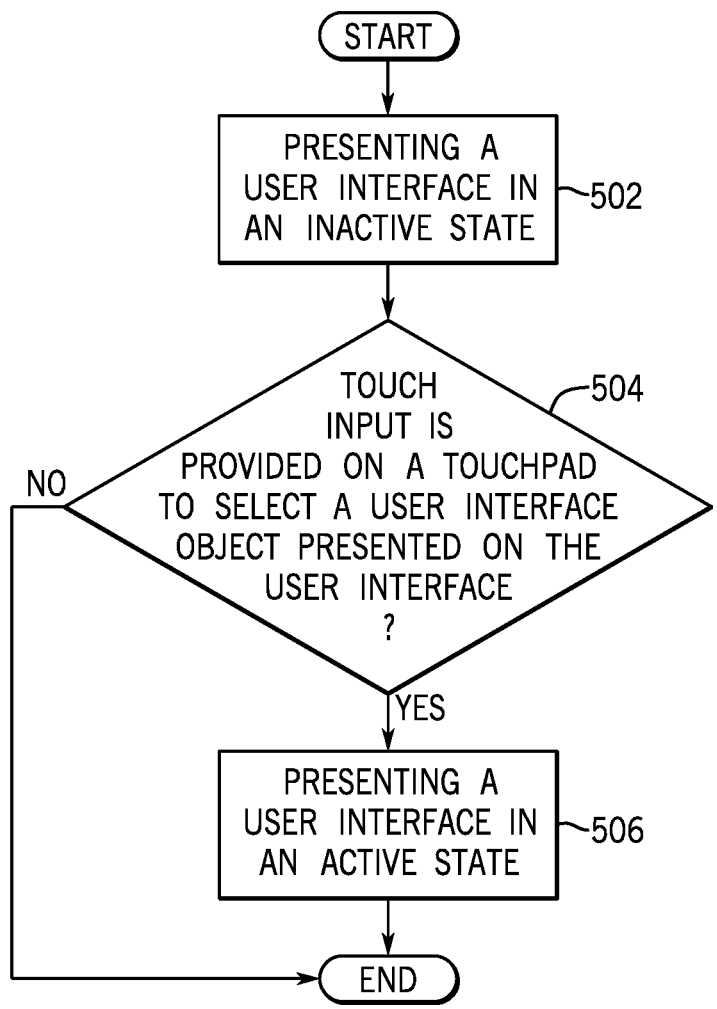
FIG. 5 illustrates an exemplary method for providing absolute and zone coordinate mapping with graphic animations from the operating environment of FIG. 1 according to an exemplary embodiment.

FIG. 5 illustrates an exemplary method 500 for providing absolute and zone coordinate mapping with graphic animations from the operating environment of FIG. 1 according to an exemplary embodiment. At block 502, the method 500 may include presenting a user interface in an inactive state. As discussed above, when the one or more user interfaces that are presented on the display unit 104 are presented in the inactive state, the background graphic animation and the UI object graphic animation may be presented in the inactive format. In one embodiment, the back ground graphic animation may be presented as a stationary graphic when the user interface is in the inactive state.

At block 504, the method 500 may include determining if a touch input is provided on a touchpad 108 to select a user interface object presented on the user interface. In one embodiment, the determination as to if the touch input provided by the user 138 on the touchpad 108 may be based on the absolute mapped position of the touch input received on the touchpad 108, as discussed above. In an alternate embodiment, the determination as to if the touch input provided by the user 138 on the touchpad 108 may be based on the zone mapped position of the touch input received on the touchpad 108, as discussed above.

At block 506, the method 500 may include presenting the user interface in an active state. As discussed above, when the one or more user interfaces are presented within the active state, the background graphic animation and the UI object graphic animation are presented in the active format. In one embodiment, within the active state, the background graphic animation may be presented with a hovering effect emitting out from the user interface object graphic animation of the user interface object. In another embodiment, the background graphic animation may be presented as a moving graphic when the user interface is presented in the active state. In one or more embodiments, the location of the background graphic animation and the UI object graphic animation may be determined based on the absolute mapped position of the touch input received by the user 138 on the touchpad 108. In an alternate embodiment, the location of the background graphic animation and the UI graphic animation may be determined based on the zone mapped position of the touch input received by the user 138 on the touchpad 108.

As discussed, various embodiments of absolute zone mapping system 100 may be utilized. Also, numerous components and technologies that have not been discussed herein may be utilized to compute operations associated with the absolute zone mapping system 100. It is to be appreciated that the touchpad 108 of the absolute zone mapping system 100, may be part of the display unit 104. For example, the touchpad 108 may be overlaid upon the display screen 110 so that the surface 140 of the touchpad 108 devises a clear layer overlaying the display screen 110.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for presenting a moving graphic animation in an inactive state and an active state, comprising:
   determining an inactivity determination that a touchpad provided on a vehicle has not received a touch input in a predetermined amount of time;
   presenting a user interface in the inactive state in response to the inactivity determination, wherein a background graphic animation and a user interface object graphic animation are presented on the user interface in an inactive format, wherein presenting the user interface in the inactive state includes presenting the background graphic animation as a moving graphic that includes at least one feature moving in a first direction;
   determining that a touch input is provided on the touchpad at a mapped position to map a selected user interface object presented on the user interface based on at least one of: an absolute mapped position and a zone coordinate mapped position of the touch input received on the touchpad;
   determining a second direction based on at least one of: the absolute mapped position and the zone coordinate mapped position of the touch input received on the touchpad, wherein the second direction is different than the first direction; and
   presenting the user interface in the active state in response to the touch input received on the touchpad, wherein the background graphic animation and the user interface object graphic animation are presented on the user interface in an active format, wherein the background graphic animation is presented as a moving graphic that includes the at least one feature moving in the second direction to indicate correspondence of the mapped position of the touch input to the selected user interface object.

2. The method of claim 1, wherein the at least one feature includes at least one of: a shape, a pattern, an illustration, a picture, and a color, wherein the at least one feature is presented as a changing feature that changes as the user interface is presented in the inactive state.

3. The method of claim 1, wherein presenting the user interface in the inactive state includes presenting the user interface object graphic animation in a three-dimensional format as the background graphic animation is presented as a moving graphic that includes a pattern that changes as the user interface is presented in the inactive state, wherein the user interface object graphic animation includes an illustration representing a context of a function that is associated with a corresponding user interface object, wherein the user interface object graphic animation is presented in a tilted angled manner in the inactive format in a direction that corresponds to the direction of at least one feature of the background graphic animation.

4. The method of claim 1, wherein determining that the touch input is provided on the touchpad to map the selected user interface object includes mapping the absolute mapped position of touchpad coordinates associated with a portion of a surface of the touchpad where the touch input is received, wherein the touchpad coordinates are mapped to display coordinates of a display screen that is presenting the user interface.

5. The method of claim 1, wherein determining that the touch input is provided on the touchpad to map the selected user interface object includes mapping the zone coordinate mapped position of touchpad coordinates associated with a portion of a surface of the touchpad where the touch input is received, wherein the touchpad coordinates are mapped to display coordinates of a display screen that is presenting the user interface and a plurality of touch input zones are provided on the touchpad, wherein the plurality of touch input zones are mapped to a plurality of display input zones on the display screen.

6. The method of claim 1, wherein presenting the user interface in the active state includes presenting the background graphic animation at a location of the user interface that corresponds to the selected user interface object, wherein the at least one feature includes at least one of: a shape, a pattern, an illustration, a picture, and a color.

7. The method of claim 6, wherein presenting the background graphic animation in the active format includes presenting the background graphic animation with a focal point that corresponds to the selected user interface object, wherein the at least one feature is modified to be presented at an angle that is based on a direction of the touch input.

8. The method of claim 1, wherein presenting the user interface in the active state includes presenting the user interface object graphic animation at a location of the user interface that corresponds to the selected user interface object, wherein the user interface object graphic animation is presented in a two-dimensional format in the active format that includes an animation representing a context of a function that is associated with a corresponding user interface object, wherein the user interface object graphic animation is presented in a different angle in the active format than in the inactive format.

9. The method of claim 8, wherein presenting the user interface object graphic animation in the active format includes presenting a touch graphic indicator above the user interface object graphic animation at the location of the user interface that corresponds to the selected user interface object.

10. A system for presenting a moving graphic animation in an inactive state and an active state, comprising:
a memory storing instructions when executed by a processor cause the processor to:
determine an inactivity determination that a touchpad provided on a vehicle has not received a touch input in a predetermined amount of time;
present a user interface in the inactive state in response to the inactivity determination, wherein a background graphic animation and a user interface object graphic animation are presented on the user interface in an inactive format, wherein presenting the user interface in the inactive state includes presenting the background graphic animation as a moving graphic that includes at least one feature moving in a first direction;
determine that a touch input is provided on the touchpad at a mapped position to map a selected user interface object presented on the user interface based on at least one of: an absolute mapped position and a zone coordinate mapped position of the touch input received on the touchpad;
determine a second direction based on at least one of: the absolute mapped position and the zone coordinate mapped position of the touch input received on the touchpad, wherein the second direction is different than the first direction; and
present the user interface in the active state, wherein the background graphic animation and the user interface object graphic animation are presented on the user interface in an active format, wherein the background graphic animation is presented as a moving graphic moving in the second direction to indicate correspondence of the mapped position of the touch input to the selected user interface object, wherein the moving graphic includes the at least one feature with a hovering effect emitting out from the user interface object graphic animation of the selected user interface object.

11. The system of claim 10, wherein presenting the user interface in the inactive state includes presenting at least one feature, wherein the at least one feature includes at least one of: a shape, a pattern, an illustration, a picture, and a color.

12. The system of claim 10, wherein presenting the user interface in the inactive state includes presenting the user interface object graphic animation in a three-dimensional format as the background graphic animation is presented as a moving graphic that includes a pattern that changes as the user interface is presented in the inactive state, wherein the user interface object graphic animation includes an illustration representing a context of a function that is associated with a corresponding user interface object, wherein the user interface object graphic animation is presented in a tilted angled manner in the inactive format in a direction that corresponds to the direction of at least one feature of the background graphic animation.

13. The system of claim 10, wherein determining that the touch input is provided on the touchpad to map the selected user interface object includes mapping the absolute mapped position of touchpad coordinates associated with a portion of a surface of the touchpad where the touch input is received, wherein the touchpad coordinates are mapped to display coordinates of a display screen that is presenting the user interface.

14. The system of claim 10, wherein determining that the touch input is provided on the touchpad to map the selected user interface object includes mapping the zone coordinate mapped position of touchpad coordinates associated with a portion of a surface of the touchpad where the touch input is received, wherein the touchpad coordinates are mapped to display coordinates of a display screen that is presenting the user interface and a plurality of touch input zones are provided on the touchpad, wherein the plurality of touch input zones are mapped to a plurality of display input zones on the display screen.

15. The system of claim 10, wherein presenting the user interface in the active state includes presenting the background graphic animation at a location of the user interface that corresponds to the selected user interface object, wherein the at least one feature includes at least one of: a shape, a pattern, an illustration, a picture, and a color.

16. The system of claim 15, wherein presenting the background graphic animation in the active format includes presenting the background graphic animation with a focal point that corresponds to the selected user interface object, wherein at least one feature is modified to be presented at an angle that is based on a direction of the touch input.

17. The system of claim 10, wherein presenting the user interface in the active state includes presenting the user interface object graphic animation at a location of the user interface that corresponds to the selected user interface object, wherein the user interface object graphic animation is presented in a two-dimensional format in the active format that includes an animation representing a context of a function that is associated with a corresponding user interface object, wherein the user interface object graphic animation is presented in a different angle in the active format than in the inactive format.

18. The system of claim 17, wherein presenting the user interface object graphic animation in the active format includes presenting a touch graphic indicator above the user interface object graphic animation at the location of the user interface that corresponds to the selected user interface object.

19. A non-transitory computer readable storage medium storing instructions that when executed by a computer, which includes a processor perform a method, the method comprising:
determining an inactivity determination that a touchpad provided on a vehicle has not received a touch input in a predetermined amount of time;
presenting a user interface in an inactive state in response to the inactivity determination, wherein a background graphic animation and a user interface object graphic animation are presented on the user interface in an inactive format, wherein presenting the user interface in the inactive state includes presenting the background graphic animation as a moving graphic that includes at least one feature moving in a first direction;
determining that a touch input is provided on the touchpad at a mapped position to map a selected user interface object presented on the user interface based on at least one of: an absolute mapped position and a zone coordinate mapped position and a zone coordinate mapped position of the touch input received on the touchpad;
determining a second direction based on at least one of: the absolute mapped position and the zone coordinate mapped position of the touch input received on the touchpad, wherein the second direction is different than the first direction; and
presenting the user interface in an active state, wherein the background graphic animation and the user interface object graphic animation are presented on the user interface in an active format, wherein the background graphic animation is presented as a moving graphic, moving in the second direction to indicate correspondence of the mapped position of the touch input to the selected user interface object, wherein the moving graphic includes the at least one feature with a hovering effect emitting out from the user interface object graphic animation of the selected user interface object.

20. The non-transitory computer readable storage medium of claim 19, wherein presenting the user interface in the active state includes presenting the background graphic animation at a location of the user interface that corresponds to the selected user interface object, wherein the at least one feature includes at least one of: a shape, a pattern, an illustration, a picture, and a color.

* * * * *